US010360525B1

(12) United States Patent
Milden et al.

(10) Patent No.: US 10,360,525 B1
(45) Date of Patent: Jul. 23, 2019

(54) TIMELY QUALITY IMPROVEMENT OF AN INVENTORY OF ELEMENTS

(71) Applicant: Wells Fargo Bank, N.A., Charlotte, NC (US)

(72) Inventors: Robert Milden, Waxhaw, NC (US); Timothy Carbery, Amherst, NH (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 401 days.

(21) Appl. No.: 15/044,647

(22) Filed: Feb. 16, 2016

(51) Int. Cl.
G06Q 10/00 (2012.01)
G06Q 10/06 (2012.01)
G06Q 10/08 (2012.01)

(52) U.S. Cl.
CPC ....... *G06Q 10/0635* (2013.01); *G06Q 10/087* (2013.01)

(58) Field of Classification Search
CPC .......................................... G06Q 10/00–50/00
USPC ................................................ 705/7.11–7.42
See application file for complete search history.

(56) References Cited

U.S. PATENT DOCUMENTS

| | | | | |
|---|---|---|---|---|
| 6,029,144 A * | 2/2000 | Barrett | ................... | G06Q 99/00 235/375 |
| 6,718,342 B1 * | 4/2004 | Schultz | ................... | G06Q 10/06 |
| 6,912,502 B1 * | 6/2005 | Buddle | ................... | G06Q 10/10 705/7.41 |
| 7,113,914 B1 * | 9/2006 | Spielmann | ......... | G06Q 10/0635 705/7.28 |
| 7,433,829 B2 * | 10/2008 | Borgia | ............. | G06Q 10/06311 705/7.13 |
| 7,752,125 B1 * | 7/2010 | Kothari | ................... | G06Q 20/10 705/38 |
| 7,899,694 B1 * | 3/2011 | Marshall | ............... | G06Q 10/063 705/7.32 |
| 8,606,615 B2 * | 12/2013 | Milden | ................... | G06Q 40/02 705/7.27 |
| 8,700,414 B2 * | 4/2014 | Rothermel | ........... | G06Q 10/103 705/1.1 |
| 8,769,412 B2 * | 7/2014 | Gill | ........................ | G06F 21/55 715/736 |
| 9,300,676 B2 * | 3/2016 | Madhu | ................. | G06Q 50/265 |
| 9,774,616 B2 * | 9/2017 | Flores | ................. | H04L 63/1433 |

(Continued)

OTHER PUBLICATIONS

Brabham, Daren C. "Crowdsourcing as a model for problem solving: An introduction and cases." Convergence 14.1 (2008): 75-90 (Year: 2008) .*

*Primary Examiner* — Alan S Miller
(74) *Attorney, Agent, or Firm* — Walter Haverfield LLP; James J. Pingor

(57) ABSTRACT

Timely quality improvement of an inventory of elements is provided. An event submission that includes at least one element of the inventory of elements is received at about the same time as the event is encountered. The event submission is prioritized based on factors related to the submitter, the event, historical information, or combinations thereof. A risk level or rating is assigned to the event submission and others are invited to comment on the event submission. Based on the comments, real-time information is presented so that the event submission may be tracked during the process. The submitter of the event submission is assigned a credibility rating and is given an incentive for providing the event submission.

18 Claims, 14 Drawing Sheets

(56) References Cited

U.S. PATENT DOCUMENTS

| | | | | |
|---|---|---|---|---|
| 2002/0184068 A1* | 12/2002 | Krishnan | G06Q 10/06 | 705/317 |
| 2003/0033179 A1* | 2/2003 | Katz | G06Q 10/063 | 705/7.12 |
| 2003/0036947 A1* | 2/2003 | Smith, III | G06Q 10/10 | 705/300 |
| 2003/0110067 A1* | 6/2003 | Miller | G06Q 10/06 | 705/7.23 |
| 2003/0110228 A1* | 6/2003 | Xu | G06Q 10/10 | 709/207 |
| 2004/0133439 A1* | 7/2004 | Noetzold | G06Q 30/0282 | 705/35 |
| 2005/0197952 A1* | 9/2005 | Shea | G06Q 40/025 | 705/38 |
| 2006/0106675 A1* | 5/2006 | Cohen | G06Q 10/06 | 705/26.1 |
| 2006/0143034 A1* | 6/2006 | Rothermel | G06Q 10/10 | 705/301 |
| 2006/0200010 A1* | 9/2006 | Rosales | G06F 19/3481 | 600/300 |
| 2006/0224500 A1* | 10/2006 | Stane | G06Q 40/025 | 705/38 |
| 2007/0067848 A1* | 3/2007 | Gustave | G06F 21/577 | 726/25 |
| 2007/0094711 A1* | 4/2007 | Corley | G06F 21/53 | 726/3 |
| 2008/0015889 A1* | 1/2008 | Fenster | G06Q 30/018 | 705/30 |
| 2008/0033775 A1* | 2/2008 | Dawson | G06Q 10/0635 | 705/7.28 |
| 2008/0229214 A1* | 9/2008 | Hamilton | H04L 67/22 | 715/751 |
| 2008/0288330 A1* | 11/2008 | Hildebrand | G06Q 10/06 | 705/7.28 |
| 2009/0265199 A1* | 10/2009 | Moerdler | G06Q 10/00 | 705/7.39 |
| 2009/0265209 A1* | 10/2009 | Swaminathan | G06Q 10/00 | 705/7.13 |
| 2010/0169148 A1* | 7/2010 | Oberhofer | G06Q 10/06311 | 705/7.13 |
| 2011/0066562 A1* | 3/2011 | Stapleton | G06F 21/604 | 705/317 |
| 2011/0126111 A1* | 5/2011 | Gill | G06F 21/55 | 715/736 |
| 2011/0131076 A1* | 6/2011 | Leidner | G06Q 10/0635 | 705/7.28 |
| 2012/0005115 A1* | 1/2012 | Hofberg | G06Q 10/06 | 705/348 |
| 2012/0179482 A1* | 7/2012 | Garms | G06F 19/325 | 705/2 |
| 2012/0216243 A1* | 8/2012 | Gill | G06F 21/55 | 726/1 |
| 2012/0224057 A1 | 9/2012 | Gill et al. | | |
| 2012/0310850 A1* | 12/2012 | Zeng | G06N 5/02 | 705/317 |
| 2013/0041712 A1* | 2/2013 | Smoot | G06Q 40/08 | 705/7.28 |
| 2013/0085917 A1* | 4/2013 | Agarwal | G06Q 40/06 | 705/35 |
| 2013/0253940 A1* | 9/2013 | Zziwa | G06Q 50/22 | 705/2 |
| 2013/0311196 A1* | 11/2013 | Fay | G06Q 10/0635 | 705/2 |
| 2013/0311221 A1* | 11/2013 | Hernandez | G06Q 10/06 | 705/7.14 |
| 2015/0229698 A1* | 8/2015 | Swan | G06Q 10/101 | 709/203 |
| 2016/0239785 A1* | 8/2016 | Lassau | G06Q 10/063116 | |

* cited by examiner

TIMELY QUALITY IMPROVEMENT OF AN INVENTORY OF ELEMENTS

BACKGROUND

Existing Governance, Risk, and Compliance (GRC or eGRC) platforms and technology contain data that is predominantly static and by policy are reviewed on a periodic basis. Further, the input to these GRC platforms and technology are from a core team (e.g., risk personnel) and intended for a core audience (e.g., sub-populations within a business group). Therefore, these existing GRC platforms and technology fail to allow members outside the core team to provide input. Further, these existing GRC platforms and technology fail to provide timely quality improvement of an inventory of elements.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The various aspects provided herein are related to timely quality improvement of an inventory of elements. An aspect relates to a processor that executes computer executable components stored in a memory. The computer executable components may include an input manager that receives a risk event submission at substantially the same time as a risk event is encountered. The computer executable components may also include a categorization manager that prioritizes the risk event submission based on at least one parameter of the risk event submission. A priority of the risk event submission is relative to other risk events submissions (e.g., some may be ranked the same, ranked as a higher priority, or ranked as a lower priority). The computer executable components may also include a risk manager that determines a risk rating associated with the risk event submission. Also included may be a collaboration manager that obtains input for the risk event submission based, at least in part, on a priority of the risk event submission and the risk rating. Further, the computer executable components may also include a status manager that provides real-time information related to a status of the risk event submission.

Another aspect relates to a method that may include receiving, by a system comprising a processor, an event submission at substantially the same time as a potential risk event is identified by a user affected by the potential risk event. The method may also include determining, by the system, a risk rating associated with the event submission and prioritizing, by the system, the event submission based on a parameter associated with the event submission. Further, the method may include obtaining, by the system, a response for the event submission based, at least in part, on a priority of the event submission and the risk rating. In addition, the method may include outputting, by the system, real-time information related to a status of the event submission in comparison with other event submissions.

Another aspect relates to a computer-readable storage device that stores executable instructions that, in response to execution, cause a system comprising a processor to perform operations. The operations may include receiving an event submission at substantially the same time as a potential risk event is encountered by a user, wherein the user is associated with a credibility index. Further, the operations may include, assigning a risk level to the event submission based on details identified in the event submission. The operations may also include determining a priority of the event submission based on a parameter associated with the event submission and the credibility index and obtaining a response for the event submission based on the priority and a determined risk rating. The parameter relates to at least one of a submitter, an event, an identified risk, or combinations thereof. The operations may also include outputting real-time information related to a status of the event submission until the event submission is closed or another final action taken.

To the accomplishment of the foregoing and related ends, certain illustrative aspects of the innovation are described herein in connection with the following description and the annexed drawings. These aspects are indicative, however, of but a few of the various ways in which the principles of the innovation may be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Various non-limiting embodiments are further described with reference to the accompanying drawings in which.

DETAILED DESCRIPTION

Figure 1:
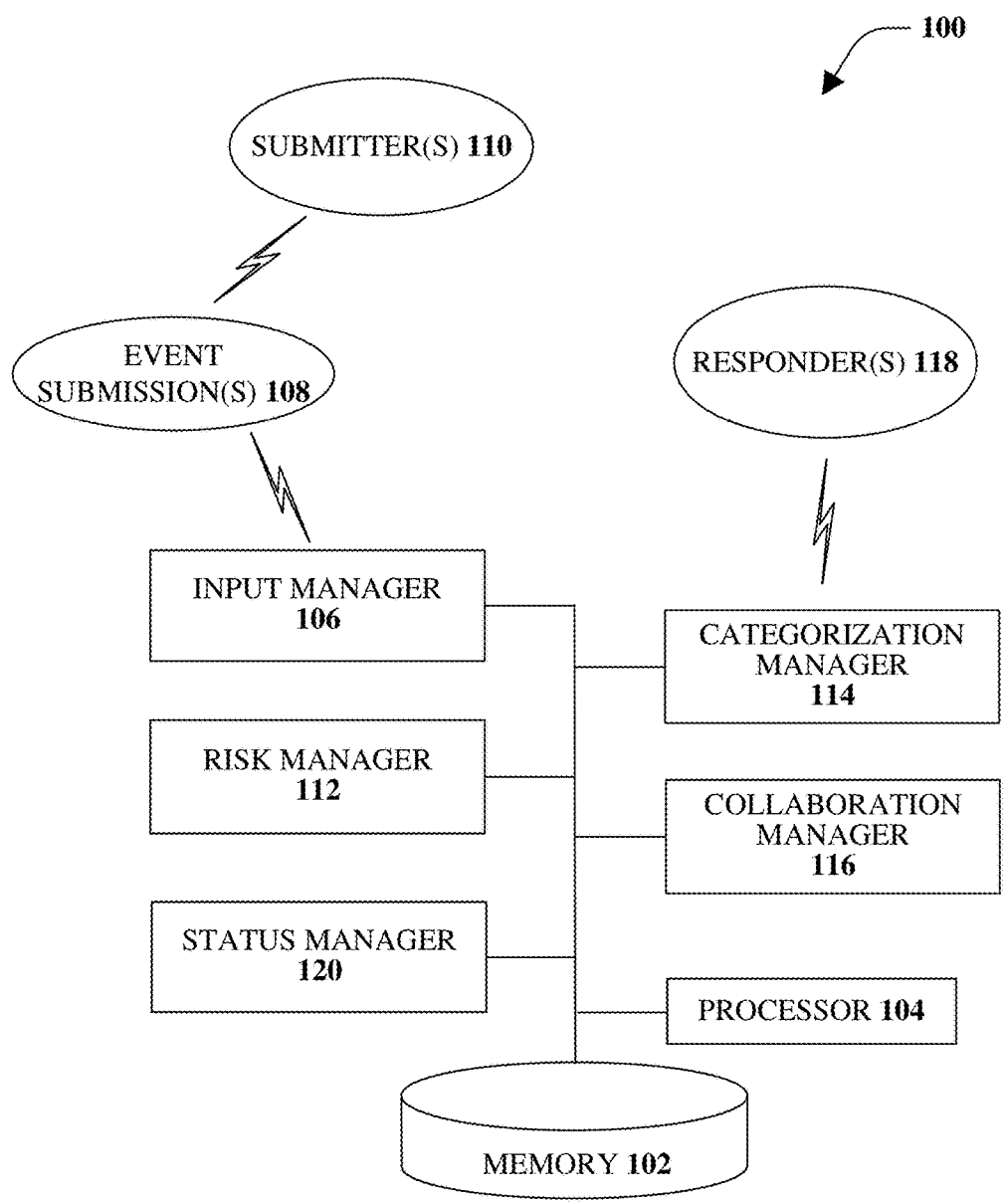
FIG. 1 illustrates an example, non-limiting system configured to facilitate notification and collaboration related to risk improvement events, according to an aspect.

The innovation is now described with reference to the drawings. In the following description, for purposes of explanation, numerous specific details are set forth in order to provide a thorough understanding of the subject innovation. It may be evident, however, that the innovation may be practiced without these specific details. In other instances, well-known structures and devices are shown in block diagram form in order to facilitate describing the innovation.

Various aspects described herein relate to an application (e.g., a desktop application, a mobile application, and so on) and associated interfaces that provide Governance, Risk, and Compliance (GRC or eGRC) platforms and technology configured to accept inputs from a broad community of personnel and is not limited to input from a "core team" that manages risk for an organization. The disclosed aspects allow employees of an organization to submit "in the moment" risk improvement events (e.g., an event submission) that may pose an operational risk to the organization. "In the moment" refers to submission of risk improvement events at substantially the same time as the risk is encountered, or after the risk is encountered, by the person that experienced the potential risk event.

The various aspects may be configured to prioritize the event submission(s) as a function of the context of the submission, event type, criticality, and other parameters. For example, the various aspects may be configured to prioritize the event submission(s) based on the submitter's position, the submitter's relationship to the event or risk issue, and so on. After the event is processed and the risk remediated, the submitter may be assigned a rating (or other type of reward) for the submission. Thus, the submitter's overall rating may be also factored into prioritization of future event submissions by that submitter.

The collaboration application and interfaces discussed herein allows risk management information to be available to any employee within the organization. Thus, each employee may perceive not only their role in the organization, but also the policies, procedures, processes, controls, and training for their particular job function. This provides the ability for the submitter to internalize the information and utilize the information available and/or the ability to indicate that what is provided is not what they do, is outdated, should be changed, and so on.

When the submitter provides information related to something they observe that may be a problem, or a new risk that has not been documented, the risks that are known and documented within each business activity are available to that submitter (e.g., through a risk library). When the submitter reports a new risk, or a suspected risk, or an issue, the various aspects have necessary information related to who that submitter is, what the job is they are supposed to be doing, where in the process they are, and this information may be quickly transferred to a specialist in order to remediate the situation.

It is noted that although the various aspects discussed herein relate to a user manually opening a risk event, the risk event may originate from another source, such as an electronic/automatic source. Examples of electronic/automatic sources include, but are not limited to, a regulatory or governmental warning (e.g., electronic notification of a cyber-attack issued by the FBI) and/or a subscription service (e.g., a Dow Jones news wires issuing a story on a problem at a competitor). According to a further example, the electronic/automatic source may be internal systems that scan comments in social media (e.g., a comment or a posting that is criticizing the financial entity for not performing a process, not offering a service, and so on). These electronically initiated events follow a similar pattern of assessment and prioritization as that utilized by manually entered events as discussed herein.

FIG. 1 illustrates an example, non-limiting system 100 configured to facilitate notification and collaboration related to risk improvement events, according to an aspect. It is noted that although the various aspects may relate to risk improvement events, the disclosed aspects are not limited to this implementation. Instead, the various aspects may be utilized in any situation where a user reports or makes others aware of information and collaboration between one or more users (different from the reporting user) may be conducted in order to address or clarify the reported information.

Further, although the various aspects may be discussed with respect to a financial entity, the various aspects may be utilized in other environments including, for example, companies and/or industries that may be regulated (or heavily regulated), and that have regulations, policies, processes, and/or procedures. Examples include, but are not limited to, financial services, energy, healthcare, pharmaceuticals, universities, and so on.

As used herein a "financial entity" refers to a financial institution, such as a bank, persons operating on behalf of the financial institution, and/or communication devices managed by the financial institution and/or the persons operating on behalf of the financial institution. Additionally or alternatively, the entity may be a third party monitoring source or another type of entity that has a trusted relationship with the financial institution. Further, as used herein a "user" refers to an employee and/or agent of the financial institution and/or one or more devices managed by the employee and/or agent.

It is also noted that although the disclosed aspects are discussed with respect to a single company or organization, the disclosed aspects may be utilized across a set of organizations. For example, all banks have the same core processes (e.g., all banks makes payments, processes checks, and so on). With the disclosed aspects, indexes maybe made around these core processes across the different banks (e.g., scrubbing or masking identifying information). In this manner, industry averages may be obtained and benchmarks may indicate how a particular bank is performing against the industry average.

The system 100 may include at least one memory 102 that may store computer executable components and/or computer executable instructions. The system 100 may also include at least one processor 104, communicatively coupled to the at least one memory 102. The at least one processor 104 may facilitate execution of the computer executable components and/or the computer executable instructions stored in the at least one memory 102. The term "coupled" or variants thereof may include various communications including, but not limited to, direct communications, indirect communications, wired communications, and/or wireless communications.

It is noted that although the one or more computer executable components and/or computer executable instructions may be illustrated and described herein as components and/or instructions separate from the at least one memory 102 (e.g., operatively connected to the at least one memory 102), the various aspects are not limited to this implementation. Instead, in accordance with various implementations, the one or more computer executable components and/or the one or more computer executable instructions may be stored in (or integrated within) the at least one memory 102. Further, while various components and/or instructions have been illustrated as separate components and/or as separate instructions, in some implementations, multiple components and/or multiple instructions may be implemented as a single component or as a single instruction. Further, a single component and/or a single instruction may be implemented as multiple components and/or as multiple instructions without departing from the example embodiments.

Also included in the system 100 may be an input manager 106 that may be configured to receive an event submission 108 from a user (e.g., from a device associated with the user), referred to as a submitter 110. Although illustrated as a single event submission and a single submitter, there may be more than one submitter and/or more than one event submission by the same, or different, submitters. The two or more event submissions may be related to similar situations, or to different situations. According to an implementation, the event submission 108 may be an alert that is related to a problem, a perceived problem, a deviation from a standard or policy, or something else for which the submitter 110 believes needs clarification, resolution, instructions, more information, and so on.

Further, the event submission 108 may be associated with an inventory of elements. For example, the inventory of elements may include a corporation's policies, procedures, training programs, and so on. Other examples of the inventory of elements may include, but are not limited to, laws, requirements, contracts, contract terms, tools, business activities, controls, metrics, and so on.

The submitter 110 may be identified by the input manager 106 based upon receipt of information indicative of the submitter 110. For example, the submitter 110 may be identified based on credentials (e.g., a login/password pair, biometric identification, and so on). In another example, the submitter 110 may be identified based on information received from the submitter's device (e.g., a Temporary Mobile Subscriber Identity (TMSI), an International Mobile Subscriber Identity (IMSI), and Internet Protocol (IP) address, and so on). Other manners of identifying the submitter may also be utilized.

A risk manager 112 may be configured to determine a risk rating associated with the event submission 108. For example, if the event submission relates to a bank vault door being left unlocked all weekend, there is a limited number of people that should have access to this information. In another example, if the event submission indicates how a field in a financial transfer instruction may be selected to allow a multi-million dollar international transaction to be processed without approval, only a few people should have access to this information due to its sensitive nature.

Thus, based on the risk rating assigned by the risk manager 112, individuals that have access to the event submission 108 may be limited to select individuals. These select individuals may be predetermined and may be limited to a particular role or security level within the organization (e.g., vice-presidents, managers, supervisor, and so forth) and/or to a particular location (e.g., the main office, a branch office, and so on).

The risk manager 112 may determine the risk rating based on various information provided by the submitter 110. For example, the risk rating may be inferred based on key words and/or phrases in a description of the event. In another example, the risk rating may be based on a response to the event submission (as will be discussed further below).

The system 100 may also include a categorization manager 114 that may be configured to prioritize the event submission 108 (in comparison to other risk event submissions) based on at least one parameter associated with the respective risk event submission. In an example, a parameter may include submitter's relationship to a risk issue identified in the risk event submission. In another example, a parameter may include a rating associated with a submitter of the risk event submission. Other examples of parameters may include, but are not limited to, a type of event, a criticality of the event, a location of the event, a credibility associated with the submitter, and so on.

In another example, a parameter may be a number of event submissions received related to the same event or a similar event. For example, if there is one person reporting an error, it might not be a concern. However, if twenty people report the same error, it may indicate a larger concern and may provide an early warning indicator that something is going wrong. This may drive faster attention to the early warning indicator rather than having to wait for a next regularly scheduled control review.

Also included in the system 100 may be collaboration manager 116 that may be configured to share the event submission 108 with at least one user that may submit a response, referred to as responders 118. It is noted that even though the users that are invited to respond to the event submission 108 are referred to as responders, in some cases, a response might not be received from one or more of the responders. In accordance with some implementations, a submitter in one situation might be a responder in another situation.

The collaboration manager 116 may be configured to select the responders 118 based on various criteria including, but not limited to, a response score, a position within the company, a length of time employed at the company, a security level, and so on. Thus, according to some implementations, the collaboration manager 116 may dynamically route information related to the event submission 108 to those that might be able to resolve the event submission. For example, the collaboration manager 116 may access historical information related to a set of responders and, based on parameters associated with the event submission 108, a subset of the set of responders may be selected to response to the current event submission 108.

Additionally or alternatively, the selection of the responders 118 may be based on input from one or more managers or supervisors that are aware of which individuals within the organization have knowledge related to the event submission 108. The input may be utilized in cases where the collaboration manager 116 does not have enough data to select the responders 118, where additional input would be helpful to identify others that may respond to the event submission, and/or based on a sensitivity, security level, or risk level associated with the event.

According to some implementations, a time limit may be applied to each event submission. The time limit may be utilized to help ensure that event submissions are being addressed in a timely manner. After expiration of the time limit, a notice may be submitted to the responders 118, or at least a subset of the responders 118, to allow further time to reply. According to some aspects, a second set of responders may be chosen at about the same time as the time limit has expired. The second set of responding users may include at least a portion of the first set of responding users, or may include users that are different from the users in the first set. According to some implementations, if the time limit has expired, the event submission is escalated in order for others (e.g., a core risk team) to review the event and remediate the event, as appropriate.

The system 100 may also include a status manager 120 that may be configured to render status of the event submissions in any perceivable format (e.g., visual, audible, and so on). The status manager 120 may be configured to render the status related to pending submissions, completed submissions, or combinations thereof. According to some implementations, the status of only open (e.g., non-answered, not closed, not finalized) event submissions may be rendered by the status manager 120. However, according to other implementations, both open and closed (e.g., already answered) event submissions may be rendered by the status manager 120, such as through a searchable interface. According to some implementations, the risk manager 112 controls access to the searchable interface based on various risk concerns and/or policies. Further, the event submissions and responses may be searchable and retrievable for quality assurance and improvement processes.

In one implementation, the status manager 120 may be configured to obtain information related to risk event submissions across an industry (e.g., among competing banks). The identifying information associated with each risk event submission may be masked. The status manager 120 may create indexes around core processes that are common across the industry. Based on these indexes, each bank (in this example) may evaluate their ranking as compared to other banks in the industry. If the ranking is lower, training or other controls may be needed, for example.

Figure 2:
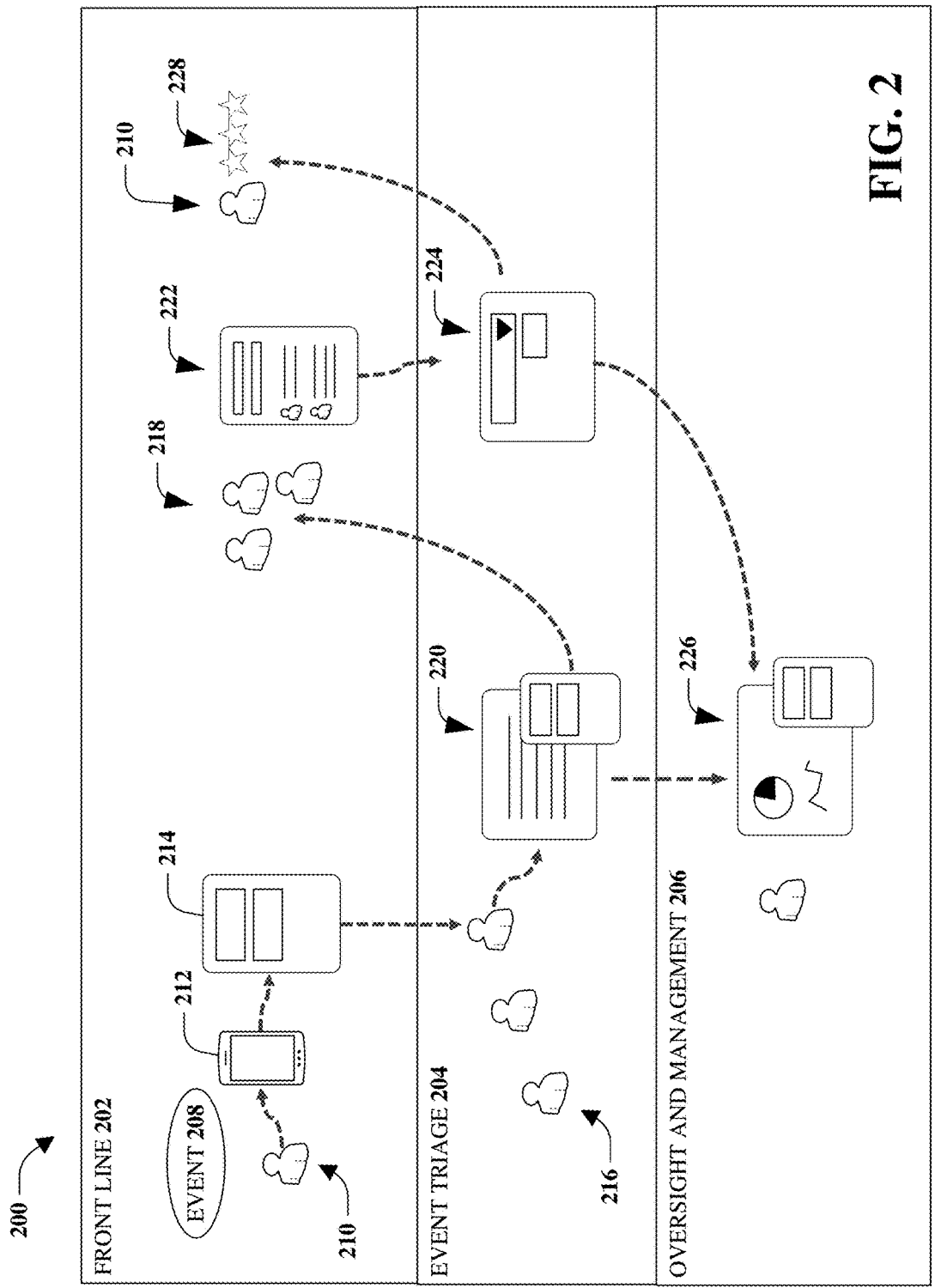
FIG. 2 illustrates an example, non-limiting risk event process, according to an implementation.

FIG. 2 illustrates an example, non-limiting risk event process 200, according to an implementation. Generally, GRC platforms and technology may be operated by a core team (risk) for the benefit of a broader audience (e.g., a sub-population of a business group). Libraries of information may be predominantly static and by policy may be reviewed on a periodic basis. The various aspects disclosed herein may enable the broader community (e.g., those whose primary responsibility is not related to risk management) to continually report and improve the risk and control environment based on what members of the broader community actually perform. Further, the reviews may be changed from a scheduled activity based on a calendar (e.g., periodically) to an "in the moment" event driven activity. This may trigger risk/compliance actions through a logic driven scoring mechanism and may reduce the latency between risk identification and risk remediation activities. This may also positively affect other team members, customers, shareholders, and so on.

The various aspects may transfer the review of information from the core GRC platform into a distributed application (both desktop/web and mobile) for "real time" triage and faster review of reported variances in the documented risk elements. Various aspects may employ knowledge of the user or associated user device (e.g., based on information indicative of a user, such as user credentials or other identifying information associated with the user), their role, applications used, processes used, key word identification, as well as past data experience in order to automate the triage. A close out process (or finalization process) may validate the end-to-end cycle of the event (identification through analysis and remediation) and may systemically review the inventory of elements for additional related improvement opportunities.

Broad access and visualization on a constant and consistent basis to relevant (e.g., based on role) risk elements may allow users to validate that their roles and functions are properly described by the elements. The ability to put this in the hands of the knowledge workers versus proxies that are removed from the day-to-day business operations may improve the risk and control environment and empower all team members to make risk a visible part of their role. In this way, the true end user may be involved in the process and latency associated with identifying issues may be reduced.

Latency in risk and control processes may allow risks to exist in an environment for significant periods of time before being identified and addressed. By excluding front line knowledge workers from the process or making it difficult for them to report risk remediation ideas may force the organization to depend more on audits, regulators, and customers to perform this role (e.g., through findings and customer complaints). This may lead to issues that may affect customers, team members, shareholders, and others, as well as increase costs due to the reactive nature of problem resolution.

As illustrated in FIG. 2, the risk event process 200 may be visualized as being divided into at least three levels or three tiers. The first tier 202 may represent the front line personnel at an organization. The middle or second tier 204 may represent event triage at a middle layer of the organization, and the third tier 206 may represent oversight and management at an executive level of the organization.

In operation, a potential risk improvement event 208 may be identified by a submitting user 210. The submitting user 210 may access a user interface (e.g., a graphical user interface) on their user device 212 and may select a "type" of the potential risk improvement event 208 and may also include an event description (e.g., comments associated with the event submission).

Based on this information, an event card 214 may be routed for event triage. As illustrated, the event card 214 may be routed to one or more users 216 (or devices associated with the one or more users 216) for additional information. The one or more users 216 may be, for example, a process manager, a product manager, a risk manager, or someone else that may provide an answer to the potential risk improvement event 208 or may properly route the information to someone that is capable of providing an answer. In some implementations, the one or more users 216 may be people that are aware of front line personnel 218 that might be most suited to evaluate and address the potential risk improvement event 208. To make the determination, one or more triage screens 220 may be presented to the one or more users 216 on their respective devices. According to some implementations, the determination as to where to route the invites (e.g., to front line personnel 218) may be determined automatically (e.g., by the collaboration manager 116 of FIG. 1 or another system component).

Based on the information provided by the one or more users 216 and/or as determined automatically, invitations to collaborate may be provided to the front line personnel 218. The front line personnel 218 may be users that have been rated highly based on previous input and collaboration. Further, according to some implementations, the front line personnel 218 may be users that have a security rating that allows them to view sensitive data.

The front line personnel 218 may accept the invitation, review the original submission, and provide their own expertise and experience. Such expertise and experience may be provided within a collaboration environment 222 on respective devices of the front line personnel 218. This information may be routed to a rapid assessment screen 224 where details of the results may be reviewed by the one or more users 216 and/or the submitting user 210.

Further, information from the one or more triage screens 220 and/or the rapid assessment screen 224 may be output in a dashboard 226 that provides an event feed, triage, current risk status, trends, issues (project status), and/or other information. The event feed may be provided on a single screen or on one or more screens, according to various aspects.

In addition, the submitting user may be assigned a configurable ranking 228. This ranking may be utilized to prioritize future submissions from that user, according to some implementations. Additional details related to this risk event process will be provided in more detail in the following description and related figures.

It is noted that the entry and/or viewing the data (or perceiving the data in another format) by the submitting user 210, the one or more users 216, and/or the front line personnel 218 may be based on various social media interfaces. Thus, people may interact with their respective device in a format that is familiar to that user and the disclosed aspects evaluate the salient information provided in order to implement the disclosed aspects.

Figure 3:
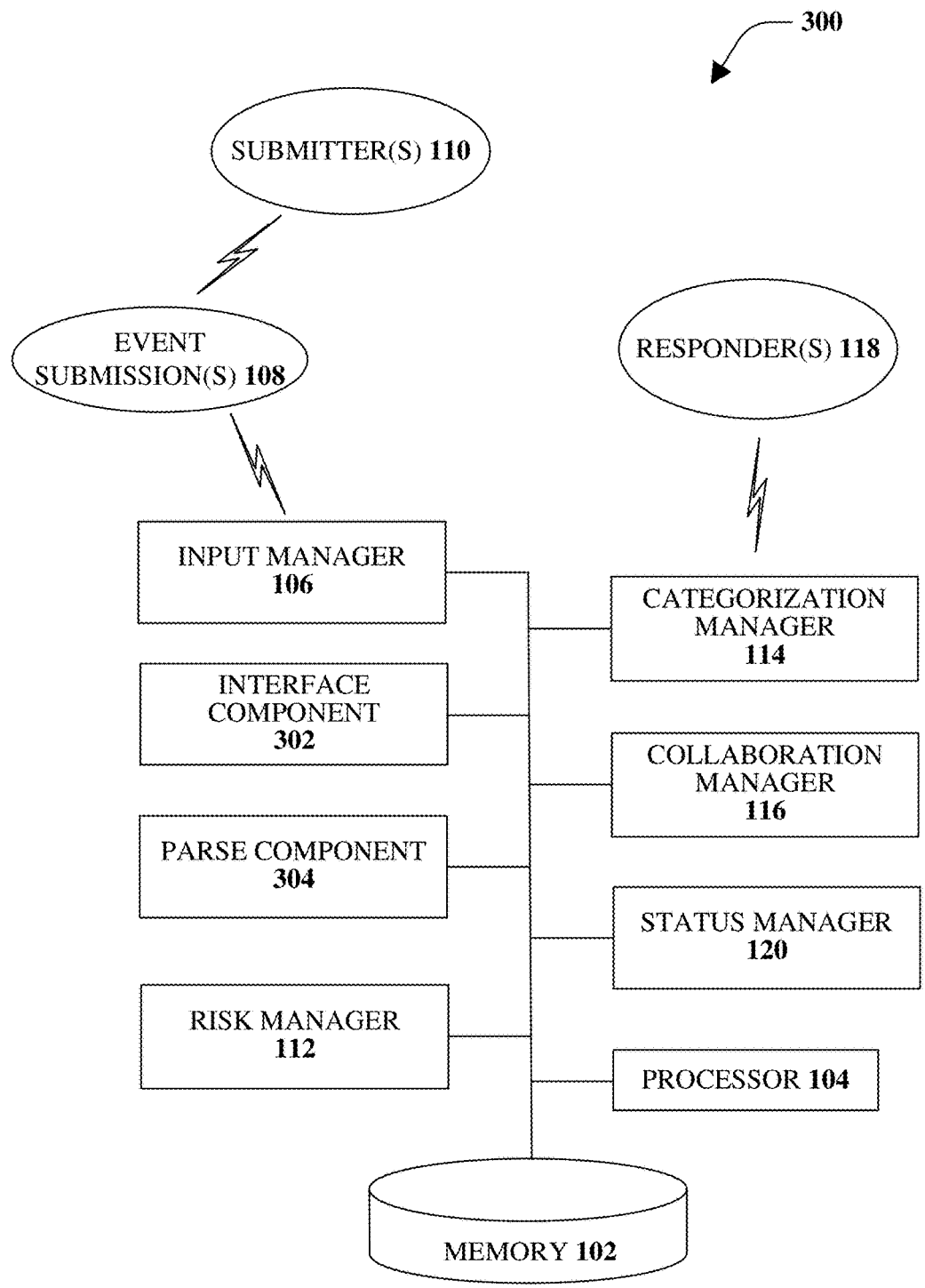
FIG. 3 illustrates an example, non-limiting system for timely addressing a risk event, according to an implementation.

FIG. 3 illustrates an example, non-limiting system 300 for timely addressing a risk event, according to an implementation. The various aspects discussed herein provide a flexible collaborative communication capability that allows teammates to identify and share risks, enhance processes, control quality, tag risk management improvement opportunities, and so forth in the moment (e.g., in real-time, substantially real-time, at about the same time, and so on). The system 300 may be configured to communicate the fact that "risk is everyone's business" through crowdsourcing risk identification, process maintenance, and control quality while rewarding high-value contributors who may not know how to otherwise get their voices heard. Thus, the system 300 may be configured to allow teammates to take personal pride and ownership in improving customer experience beyond risk management through better processes and services while generating granular data for predictive analysis.

The input manager 106 may be configured to receive an event submission 108 (e.g., the potential risk improvement event 208 of FIG. 2) from a front line entity, such as the submitter 110 (e.g., the submitting user 210 of FIG. 2). For example, the submitter 110 may utilize an interface component 302 to provide the event submission 108. The interface component 302 may be included, at least partially, on a device associated with the submitter 110. The device may be configured to execute an application that provides a platform for submission of events.

A device may also be called, and may contain some or all of the functionality of a system, subscriber unit, subscriber station, mobile station, mobile, mobile device, wireless terminal, device, remote station, remote terminal, access terminal, user terminal, terminal, wireless communication device, wireless communication apparatus, user agent, user device, or user equipment (UE). A mobile device may be a cellular telephone, a cordless telephone, a Session Initiation Protocol (SIP) phone, a smart phone, a feature phone, a wireless local loop (WLL) station, a personal digital assistant (PDA), a laptop, a handheld communication device, a handheld computing device, a netbook, a tablet, a satellite radio, a data card, a wireless modem card, and/or another processing device for communicating over a wireless system. Further, although discussed with respect to wireless devices, the disclosed aspects may also be implemented with wired devices, or with both wired and wireless devices.

The interface component 302 (as well as other interface components discussed herein) may provide a graphical user interface (GUI), a command line interface, a speech interface, Natural Language text interface, and the like. For example, a Graphical User Interface (GUI) may be rendered that provides a user with a region or means to load, import, select, read, and so forth, various requests and may include a region to present the results of the various requests. These regions may include known text and/or graphic regions that include dialogue boxes, static controls, drop-down-menus, list boxes, pop-up menus, as edit controls, combo boxes, radio buttons, check boxes, push buttons, graphic boxes, and so on. In addition, utilities to facilitate the information conveyance, such as vertical and/or horizontal scroll bars for navigation and toolbar buttons to determine whether a region will be viewable, may be employed. Thus, it might be inferred that the user did want the action performed.

The user may also interact with the regions to select and provide information through various devices such as a mouse, a roller ball, a keypad, a keyboard, a pen, gestures captured with a camera, a touch screen, and/or voice activation, for example. According to an aspect, a mechanism, such as a push button or the enter key on the keyboard, may be employed subsequent to entering the information in order to initiate information conveyance. However, it is to be appreciated that the disclosed aspects are not so limited. For example, merely highlighting a check box may initiate information conveyance. In another example, a command line interface may be employed. For example, the command line interface may prompt the user for information by providing a text message, producing an audio tone, or the like. The user may then provide suitable information, such as alphanumeric input corresponding to an option provided in the interface prompt or an answer to a question posed in the prompt. It is to be appreciated that the command line interface may be employed in connection with a GUI and/or Application Program Interface (API). In addition, the command line interface may be employed in connection with hardware (e.g., video cards) and/or displays (e.g., black and white, and Video Graphics Array (EGA)) with limited graphic support, and/or low bandwidth communication channels.

Figure 4:
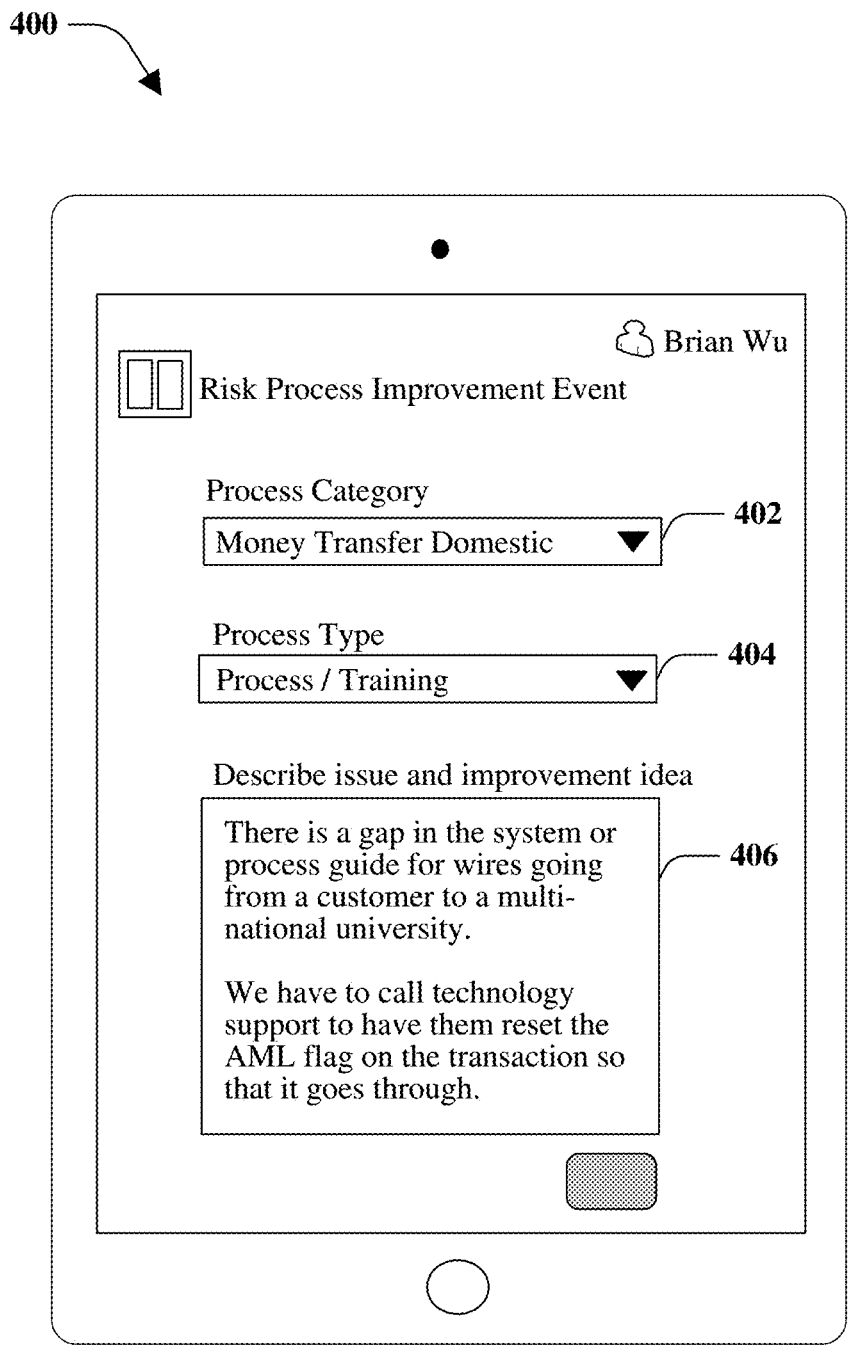
FIG. 4 illustrates an example, non-limiting input screen that may be utilized by the submitter to enter information related to the event submission, according to an aspect.

With reference also to FIG. 4, illustrated is an example, non-limiting input screen 400 that may be utilized by the submitter 110 to enter information related to the event submission 108, according to an aspect. The input screen 400 may be rendered by the interface component 302 based on selection of an event submission application executing on the device. The input screen 400 is similar to the event card 214 of FIG. 2.

The input screen 400 may include a process category field 402, a process type field 404, and a description field 406. The description field 406 may be a searchable free form field that allows the user to input the issue and/or improvement idea. The process category field 402 and/or the process type filed 404 may include drop down menus or other selectable means of identifying the process category and/or process type. Thus, these fields may be prepopulated with particular categories/types such that reports or other categorizations may be performed in conformance with various quality improvement processes and/or risk management activities.

In an example related to a financial entity, the submitter 110 may be a teller at a local bank branch, security personnel, branch managers, and others. In this example, the submitter is Brian Wu, a teller at a Jacksonville, Fla. branch of a financial entity. Brian is assisting a customer with a money transfer. While attempting the money transfer, Brian realizes there may be a problem when attempting to transfer funds from the customer to a multi-national university. Thus, Brian decides to submit a risk process improvement event (e.g., the event submission 108) to notify others and to determine if there is a solution available.

Therefore, Brian may use his device (e.g., personal device, employer provided device, and so on), to submit the risk process improvement event. In this example, the process category chosen is "Money Transfer Domestic." Further, the process type chosen is "Process/Training," in this example. In addition, a description of the issue is input into a comment field to provide context for the subject issue.

With reference again to FIG. 3, a parse component 304 may be configured to analyze words, phrases, context, and so on, within the entry in the description field 406. For example, the parse component 304 may include a library or database of keywords, phrases, synonyms, antonyms, misspellings, and so on, that represent items of interest that create a trigger event. The database allows the parse component 304 to cross-reference information in the description field 406 to the items of interest to determine if a trigger event has occurred. Further, the cross-reference to the items of interest may be utilized by the parse component 304 (or another system component) to determine whether the event submission 108 has been categorized correctly. If not, the categorization/type may be dynamically changed or overridden.

The categorization manager 114 may be configured to assign a priority to the event submission 108 as compared to other pending event submissions (e.g., prioritized higher, lower, the same, and so on). The categorization manager 114 may base the priority, at least in part, on the trigger event. According to some implementations, the categorization manager 114 may be configured to prioritize the event submission 108, in comparison with other risk improvement events, based on other criteria. For example, the prioritization may be based on a submitter's relationship to a risk issue identified in the event submission 108. In another example, the prioritization may be based on a rating associated with a submitter of the event submission 108.

Based on the prioritization (as well as other factors), the collaboration manager 116 may be configured to notify the one or more responders 118 of the event submission 108. During pendency of the event submission 108, the status manager 120 may be configured to allow the submitter 110 and/or the responders 118 to review a status of each event submission 108, or a subset thereof (e.g., based on relevancy, based on security, and so on). For example, the status manager 120 may be configured to use respective interface components to communicate with the submitter 110 and/or each responder of the responders 118.

By providing the prioritization, risk events that are determined to be higher-risk may be addressed before low-risk events. Further, if a submitter is a new employee (e.g., first week on the job), event submissions by that employee may not have as high a weight (or priority) as an event submitted by a long-term employee (provided information in the comments does not constitute a trigger event).

Figure 5:
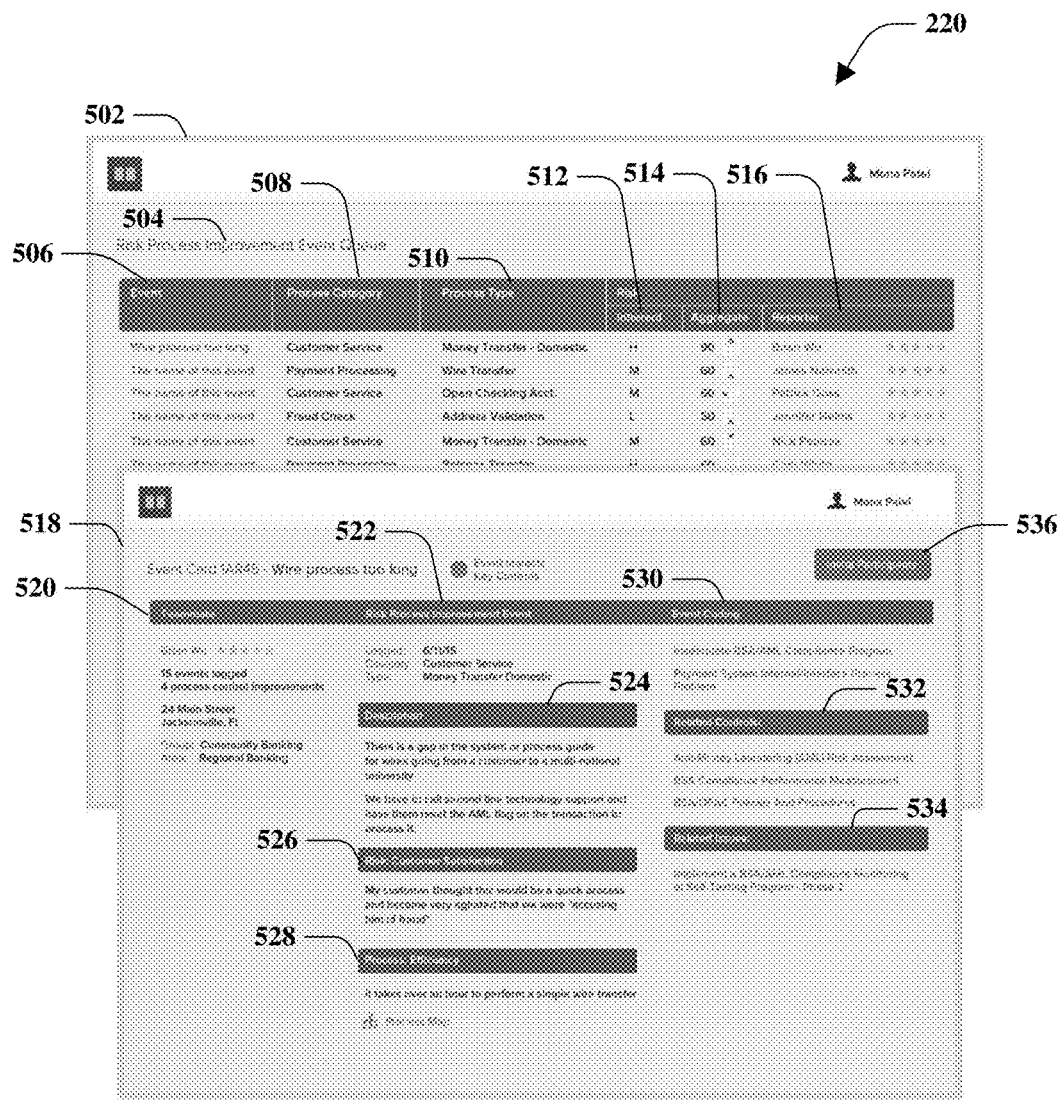
FIG. 5 illustrates example non-limiting triage screens that may be utilized with the disclosed aspects.

With reference also to FIG. 5, illustrated are example, non-limiting triage screens 220 that may be utilized with the disclosed aspects. As illustrated in a first screen 502, a risk manager (e.g., one or more users 216 of FIG. 2), referred to in this example as Mona Patel, may review an event queue 504. Information provided in the event queue 504 may include event names 506, associated process categories 508, and process types 510.

Further, a process risk 512 may be indicated, which may be determined by the categorization manager 114. In this example, the risk levels are indicated as High (H), Medium (M), and Low (L), however, other manners of identifying the respective risk levels may be utilized with the disclosed aspects. For example, the risk levels may be indicated by a numerical range (e.g., "1" for high, "2" for medium-high, "3" for medium, "4" for medium-low, and "5" for low). In another example, the risk levels may be indicated by rows that are highlighted in various colors (e.g., red for high risk, yellow for medium risk, and green for low risk).

The event queue 504 may also include a priority rating 514 as determined by the categorization manager 114. The priority rating 514 may be aggregated with the other event submissions and an overall score provided. In such a manner, those reviewing the events are made aware of the aggregate risk associated with a particular event submission.

Information related to the submitter 110 may also be included along with a user rating 516. In this example, the user rating 516 is indicated based on a series of stars that are filled in to indicate the score. For example, Brian Wu is associated with three stars, James Naismith is associated with five stars, and so on. However, other manners of indicating the user rating 516 may be utilized with the disclosed aspects.

As the risk manager, Mona Patel in this example, reviews the queue of events and an event card 518 may be opened (represented by the second screen in FIG. 5). Selection of the event card 518 may be based on selecting the event in the event queue 504. For example, the event name "Wire process too long" was selected and its associated event card opened. Since the event card 518 has been enriched by the disclosed aspects, the event card 518 provides information that allows for collaboration on the event submission 108.

As illustrated, the event card 518 may include, but is not limited to, information related to the teammate 520 that submitted the event. Such information may include name, the number of events submitted, statistics related to the events, a work address, and other work information including a work group and work area. Such information may be helpful, especially if another person wants to contact the submitter directly.

Information related to the risk process improvement event 522 may include, but is not limited to, a date the event was received, a category, and a type. Other information may include the description 524 entered by the submitter 110, a risk 526 as perceived by the submitter 110, and/or a problem 528 presented by the submitter 110. Other information included in the event card 518 may relate to event coding 530, related controls 532, and/or related issues 534.

Further, within the event card 518 there may be a selection to invite participants 536. By selecting the invite participants 536 a listing of users (e.g., responders 118) may be presented on a subsequent screen. According to some implementations, the participants may be invited by selecting respective email addresses for the desired participants. In another example, the participants may be selected based on entering names, selecting a name, clicking on a photograph, or other manners of selection.

Figure 6:
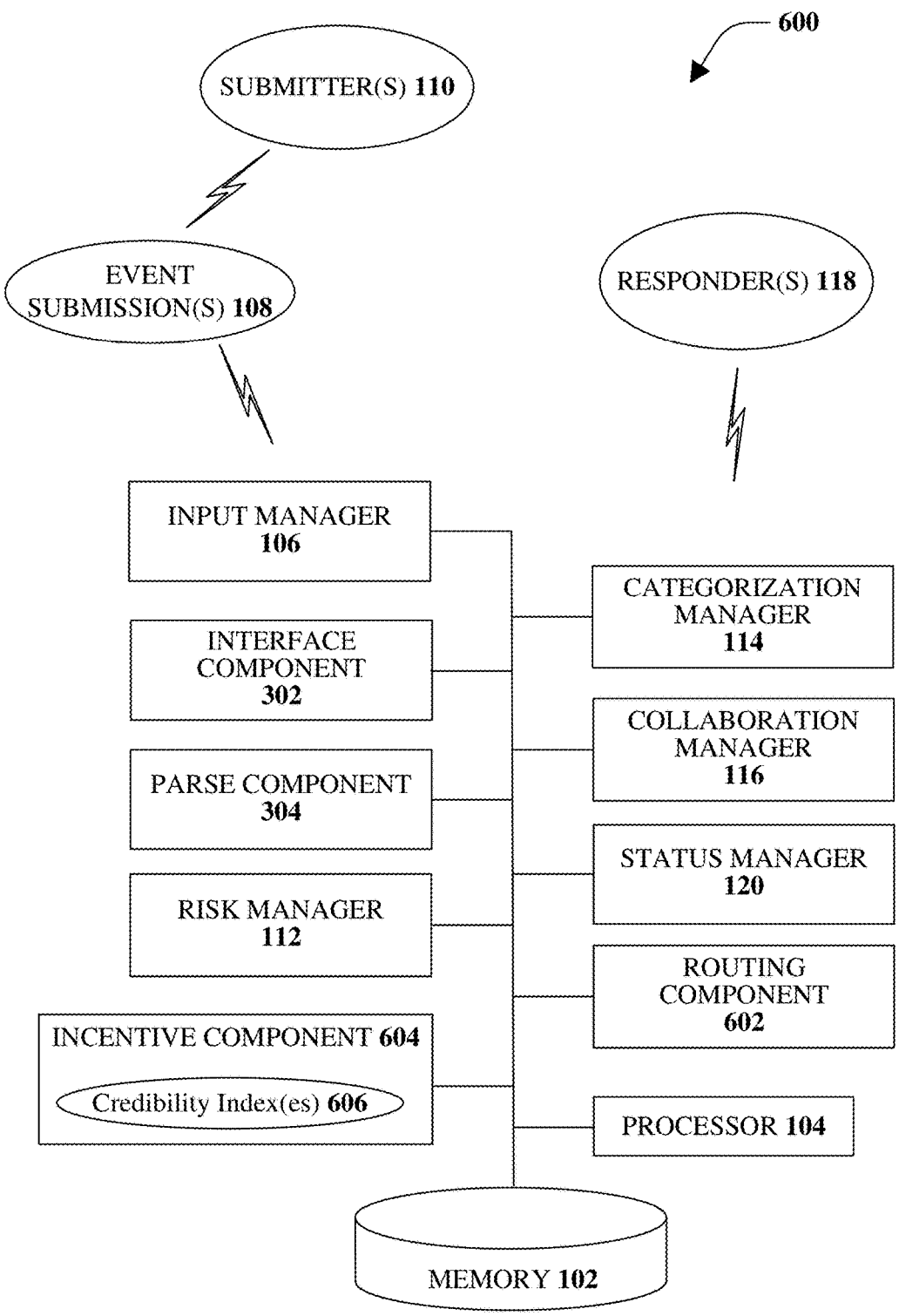
FIG. 6 illustrates an example, non-limiting system that facilitates collaboration of ideas to address identified issues related to potential risk events, according to an aspect.

FIG. 6 illustrates an example, non-limiting system 600 that facilitates collaboration of ideas to address identified issues related to potential risk events, according to an aspect. The various aspects described herein may be configured to utilize a Shared Risk Platform (SHRP), which may utilize a software package that monitors for governance, risk, and compliance, according to an aspect.

According to some implementations, a routing component 602 may be configured to automatically determine potential invitees that should have the opportunity to submit a response to the event submission. Alternatively or additionally, the routing component 602 may provide one or more recommendations as to which people should be invited to participate as responders.

The automatic determination and/or the one or more recommendations may be determined by the routing component 602 based on various data. Such data may include historical information associated with potential responders. The historical information may include length of time employed at the company, positions held at the company, knowledge base (based on certificates and/or degrees earned, proficiency tests passed, and so on). Other historical information may include a number of previous responses, quality or accuracy of the previous responses, topics associated with the previous responses, and so on. Other historical information may include ratings associated with the potential review based on input from supervisors, coworkers, customers, and others.

The system 600 may also include an incentive component 604 that may be configured to motivate each submitter 110 to identify and report an event, problem, issue, and so on. For example, the incentive component 604 may be configured to evaluate the quality of the submission and provide a ranking based on the quality. For example, the quality may relate to the potential risk that was avoided by addressing the matter associated with an event submission. According to an implementation, the quality may be based on an estimated amount of dollars that would have been lost had the risk not have been identified. In another example, the quality may be based on the amount of money recovered after identification of a risk.

Although the quality has been discussed with respect to a monetary amount, the disclosed aspects are not limited to this implementation. Instead, other manners of identifying quality may be utilized. For example, the quality may be based on identification of a training issue and the subsequent training provided. In another example, the quality may be efficiency in personnel, throughput of customer requests, increase in customer satisfaction, or combinations thereof.

Other examples of the quality may relate to scorings provided by the one or more responders 118. For example, if a responder believes the event submission is important, a first ranking may be given. On the other hand, if the responder believes the event submission is not important, a second ranking may be given. An aggregate of the scores provided by the responders 118 may be utilized to assess the quality of a particular event submission and, therefore, the submitter 110. According to some implementations, the incentive component 604 may rank each submitter based on a number of event submissions provided, an overall quality score, or combinations thereof.

The information related to each submitter may be rendered such that others within the organization may be able to determine their respective ranking as compared to others. In such as manner, competitions may be hosted in order to encourage more event submissions.

According to some implementations, the incentive component 604 assigns a credibility index 606 to each submitter. The credibility index 606 may be based on the assigned quality, the number of submissions, and other historical information associated with each submitter. The credibility index 606 may be maintained in a library or database (e.g., in at least one memory 102) and may be accessed by other system components in order to evaluate a particular submission, assign priorities, identify responders, and so on.

Figure 7:
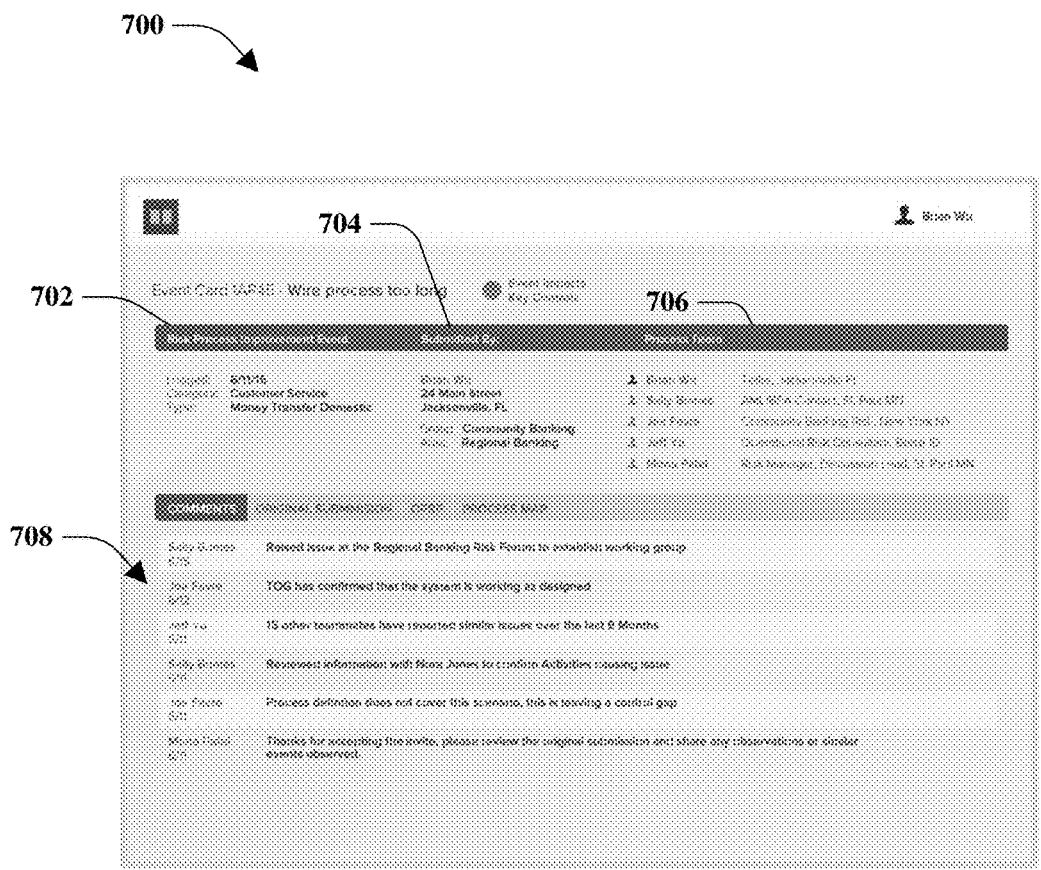
FIG. 7 illustrates a collaboration window that provides status information with respect to collaboration, according to an aspect.

With reference also to FIG. 7, illustrated is a collaboration window 700 that provides status information with respect to collaboration, according to an aspect. In this example, the collaboration window 700 (e.g., the collaboration environment 222 of FIG. 2) is being reviewed by the submitter (Brian Wu). The responders that accepted Mona's invite review the original submission and provide their own expertise and experience to resolve the issue.

As illustrated, Brian is reviewing the conversation to date. This collaboration window 700 provides the information related to the risk process improvement event 702, the submitter information 704, and the process team 706 (e.g., the responders). Further, a listing of the comments 708 is provided. The listing of comments details the name of the person that submitted the comment, the date of the comment, and the information submitted.

Figure 8:
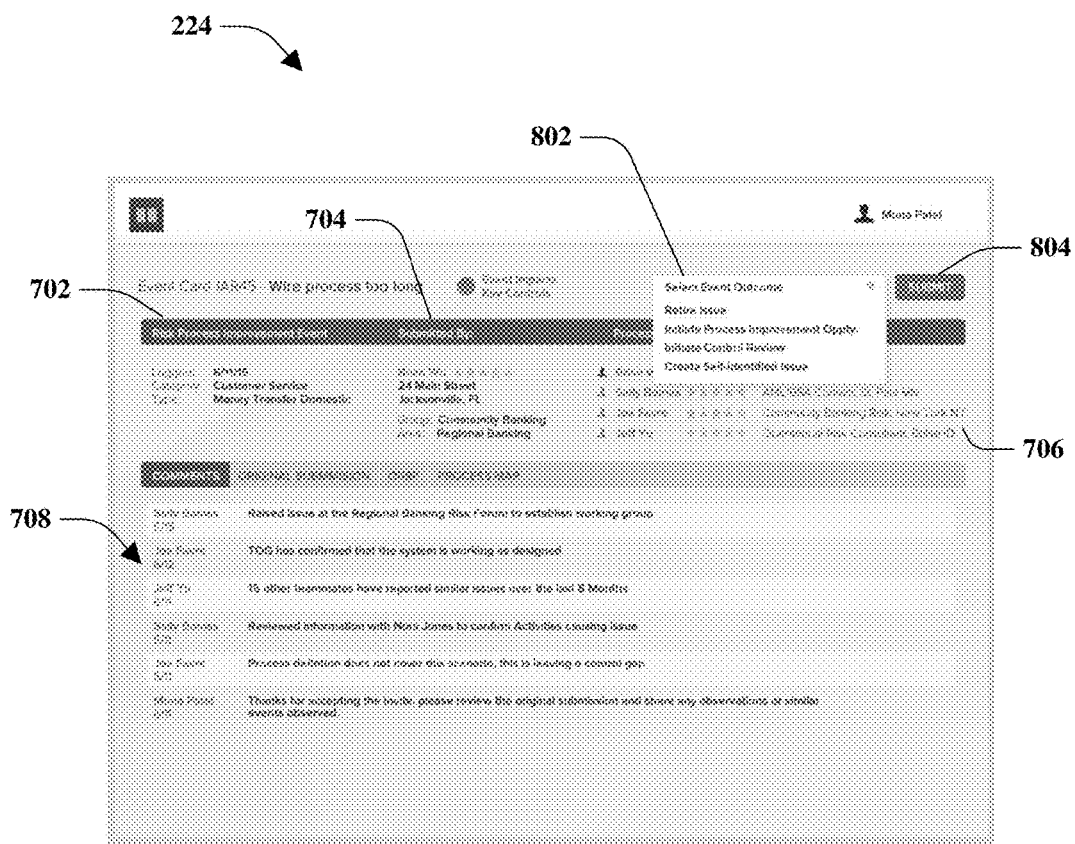
FIG. 8 illustrates an example, non-limiting rapid assessment window for escalating a reported issue to a high priority event, according to an aspect.

FIG. 8 illustrates an example, non-limiting rapid assessment screen 224 for escalating a reported issue to a high priority event, according to an aspect. The rapid assessment window 800 may be accessible by the supervisors (e.g., the one or more users 216 of FIG. 2) and includes similar information as the collaboration window 700. However, the rapid assessment window 800 includes a select event outcome menu 802 for the risk manager to determine an event outcome based on results of the collaboration.

The select event outcome menu 802 may be a drop-down menu as illustrated. Examples of selections included in the select event outcome menu 802 include "Retire Issue," "Initiate Process Improvement Opportunity," "Initiate Control Review," and "Create Self-Identified Issue." After selection of the appropriate outcome event, a submit selection 804 is chosen to implement the event outcome.

Selection of "Retire Issue" closes the event and indicates that a resolution has been completed, or is not needed. Selection of "Initiate Process Improvement Opportunity" may cause the event to be reviewed by team members in the appropriate department and further action may be taken on the event. Selection of "Initiate Control Review" may cause further analysis to be performed related to the event.

If the risk manager reviews the process team's comments 708, the determination may be that the event and process gap is serious enough to warrant creating a Self-Identified Issue. Thus, further action may be taken on the issue in addition to the risk improvement event process.

Figure 9:
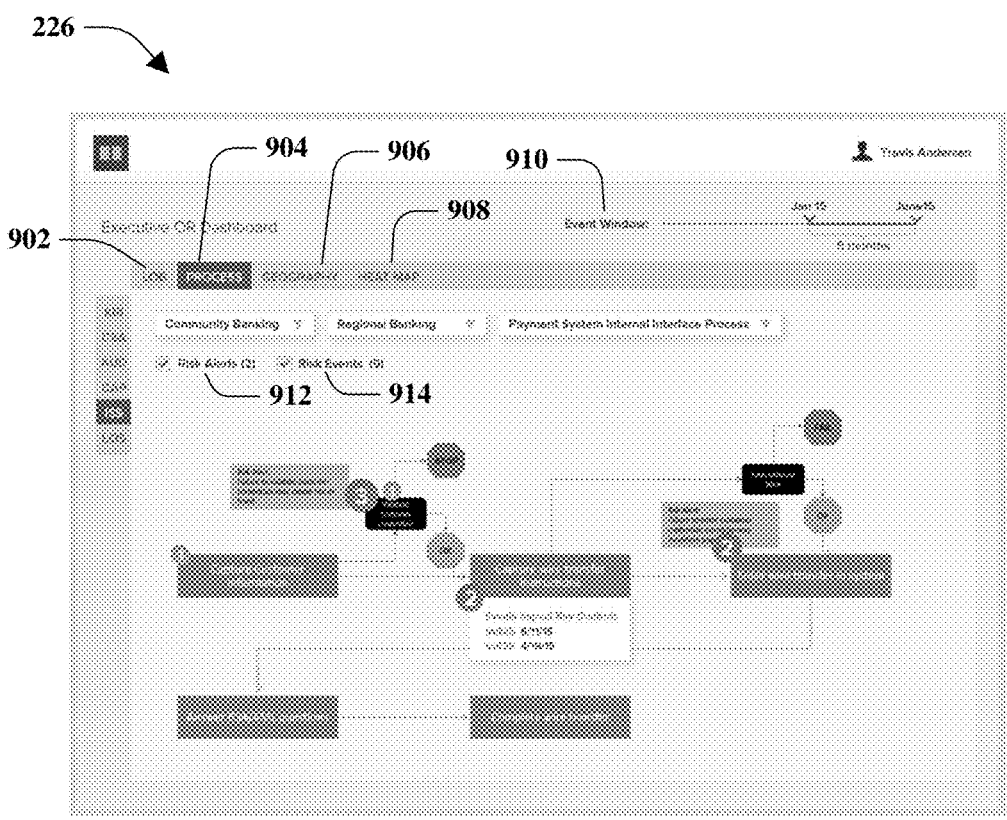
FIG. 9 illustrates an example, non-limiting executive oversight and management dashboard, according to an aspect.

FIG. 9 illustrates an example, non-limiting executive oversight and management dashboard 226, according to an aspect. The executive oversight and management dashboard 226 allows management to view a matrixed breakdown of risk across the organization.

In this example, selections may be made based on Line of Business (LOB 902), process 904, geography 906, and/or heat map 908. Also provided is an event window 910, which allows for the selection of events based on a defined time period.

In this example, an executive named Travis Andersen has selected the process 904 tab and has drilled down into the "Community Banking" processes. Also selected are "Risk Alerts" 912 and "Risk Events" 914. Further, issue project status may be viewed.

Figure 10:
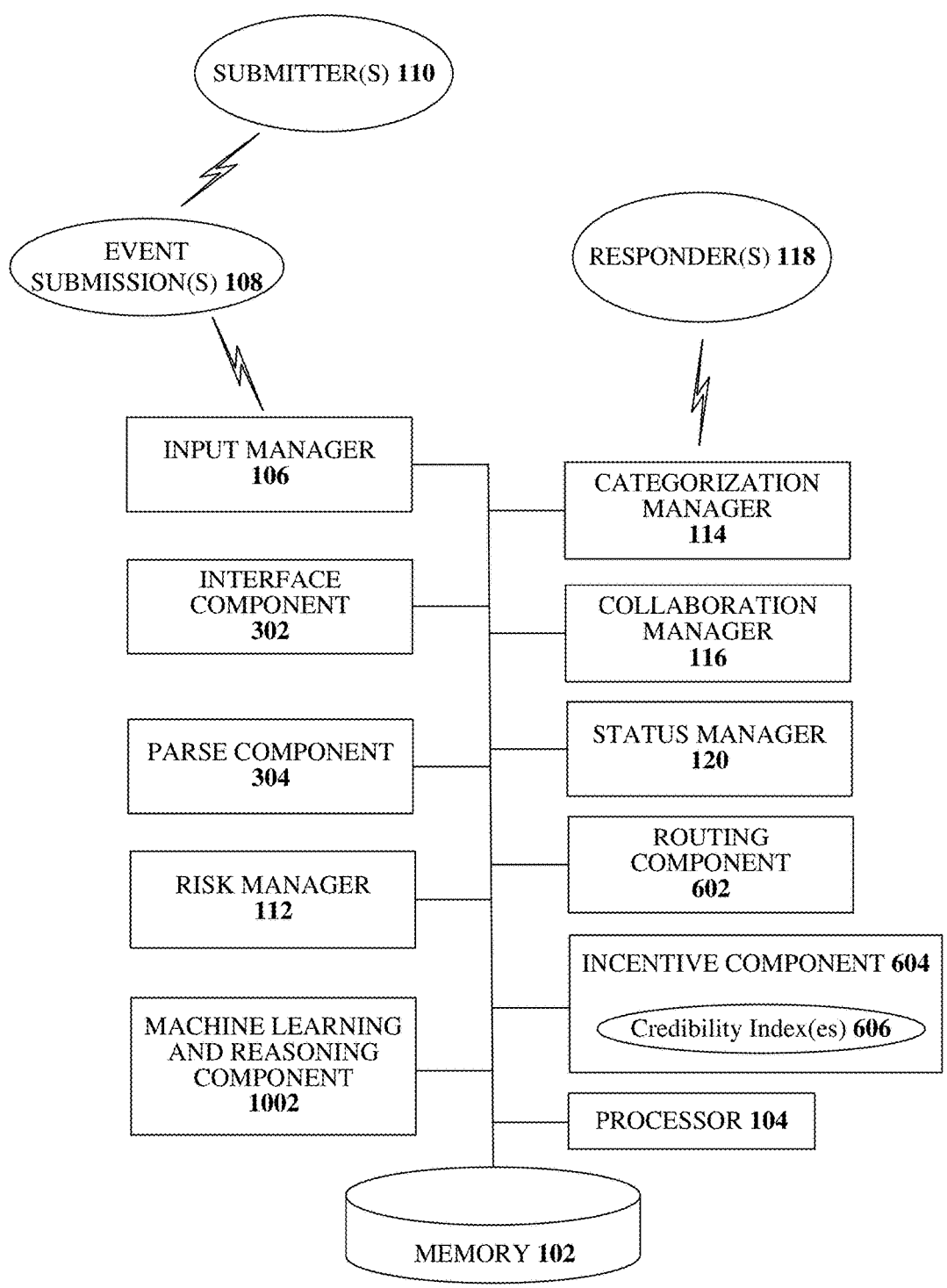
FIG. 10 illustrates an example, non-limiting system that employs automated learning to facilitate one or more of the disclosed aspects.

FIG. 10 illustrates an example, non-limiting system 1000 that employs automated learning to facilitate one or more of the disclosed aspects. For example, a machine learning and reasoning component 1002 may be utilized to automate one or more of the disclosed aspects. The machine learning and reasoning component 1002 may employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 1002 may employ principles of probabilistic and decision theoretic inference. Additionally or alternatively, the machine learning and reasoning component 1002 may rely on predictive models constructed using machine learning and/or automated learning procedures. Logic-centric inference may also be employed separately or in conjunction with probabilistic methods.

The machine learning and reasoning component may infer how events should be prioritized in comparison to other events, which participants to invite to respond to the issue, whether a score for a submitter should be changed, whether a score for a responder should be changed and so on. Based on this knowledge, the machine learning and reasoning component 1002 may make an inference based on trigger events determined based on a description of the issue, historical information associated with each person that submits an event, historical information associated with each person that responds to an event, and so on.

As used herein, the term "inference" refers generally to the process of reasoning about or inferring states of the system, a component, a module, the environment, and/or customers (or devices associated with the customers) from a set of observations as captured through events, reports, data, and/or through other forms of communication. Inference may be employed to identify a specific context or action, or may generate a probability distribution over states, for example. The inference may be probabilistic. For example, computation of a probability distribution over states of interest based on a consideration of data and/or events. The inference may also refer to techniques employed for composing higher-level events from a set of events and/or data. Such inference may result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) may be employed in connection with performing automatic and/or inferred action in connection with the disclosed aspects.

The various aspects (e.g., in connection with facilitating a collaborative event for addressing issues in real-time) may employ various artificial intelligence-based schemes for carrying out various aspects thereof. For example, a process for determining a priority of a particular issue notification, what responders should be invited to comment on an issue notification, to facilitation collaboration to resolve the issue notification, and so on may be enabled through an automatic classifier system and process.

A classifier is a function that maps an input attribute vector, $x=(x1, x2, x3, x4, xn)$, to a confidence that the input belongs to a class. In other words, $f(x)=confidence(class)$. Such classification may employ a probabilistic and/or statistical-based analysis (e.g., factoring into the analysis utilities and costs) to prognose or infer an action that should be employed to determine what transactions should be held for further scrutiny, which transactions should be automatically alerted on, which transactions should be automatically allowed, and so on. In the case of notification and collaboration, for example, attributes may be keywords or phrases in a description of an event and the classes may be identification of an identified issue that matches a trigger event.

A support vector machine (SVM) is an example of a classifier that may be employed. The SVM operates by finding a hypersurface in the space of possible inputs, which hypersurface attempts to split the triggering criteria from the non-triggering events. Intuitively, this makes the classification correct for testing data that may be similar, but not necessarily identical to training data. Other directed and undirected model classification approaches (e.g., naïve Bayes, Bayesian networks, decision trees, neural networks, fuzzy logic models, and probabilistic classification models) providing different patterns of independence may be employed. Classification as used herein, may be inclusive of statistical regression that is utilized to develop models of priority.

One or more aspects may employ classifiers that are explicitly trained (e.g., through a generic training data) as well as classifiers that are implicitly trained (e.g., by observing user behavior, by receiving extrinsic information, and so on). For example, SVM's may be configured through a learning or training phase within a classifier constructor and feature selection module. Thus, a classifier(s) may be used to automatically learn and perform a number of functions, including but not limited to determining according to a predetermined criteria which events may be resolved automatically based on historical data related to the same or a similar event, which people should be contacted to help solve the identified event, whether to open the event response to additional people, whether the event was resolved satisfactorily, and so forth. The criteria may include, but is not limited to, similar transactions, historical information, current information, event attributes, and so forth.

Additionally or alternatively, an implementation scheme (e.g., a rule, a policy, and so on) may be applied to control and/or regulate which event submissions are considered to be routine and most likely is related to a training issue. In some implementations, based upon a predefined criterion, the rules-based implementation may automatically and/or dynamically interpret attributes associated with each event. In response thereto, the rule-based implementation may automatically interpret and carry out functions associated with the events by employing a predefined and/or programmed rule(s) based upon any desired criteria.

Methods that may be implemented in accordance with the disclosed subject matter will be better appreciated with reference to the flow charts. While, for purposes of simplicity of explanation, the methods are shown and described as a series of blocks, it is to be understood and appreciated that the disclosed aspects are not limited by the number or order of blocks, as some blocks may occur in different orders and/or at substantially the same time with other blocks from what is depicted and described herein. Moreover, not all illustrated blocks may be required to implement the disclosed methods. It is to be appreciated that the functionality associated with the blocks may be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods might alternatively be represented as a series of interrelated states or events, such as in a state diagram.

Figure 11:
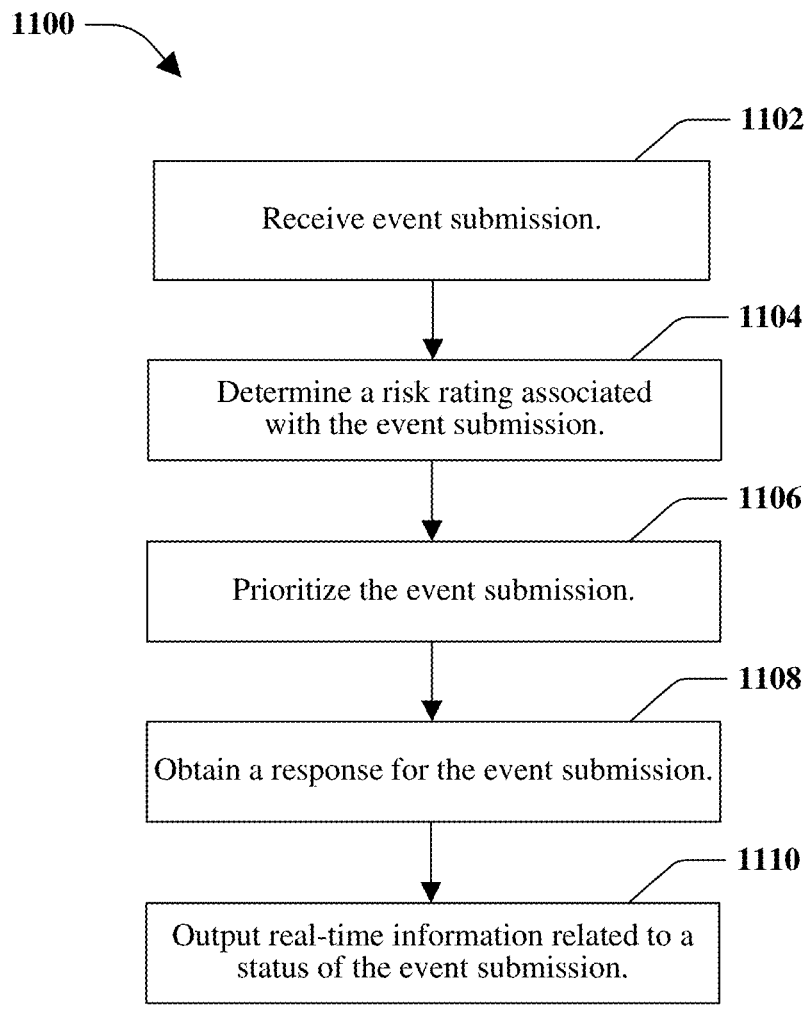
FIG. 11 illustrates an example, non-limiting method for timely quality improvement of an inventory of elements, according to an aspect.

FIG. 11 illustrates an example, non-limiting method 1100 for timely quality improvement of an inventory of elements, according to an aspect. The method 1100 in FIG. 11 may be implemented using, for example, any of the systems, such as the system 300 (of FIG. 3), described herein.

In many organizations, there are centralized groups that perform risk or compliance management. However, risk/compliance should be a concern for everyone in the organization. The disclosed aspects facilitate interaction and collaboration among those that may be co-located, or that may be in various geographically dispersed areas. The disclosed aspects empower every person in the organization to think about risk issues and leverages this knowledge to benefit the organization and others that interact with the organization (e.g., other employees, customers, vendors, and so on).

The various aspects may be configured to develop and render information around policies, processes, controls, people and their roles within the organization, as well as other information. Thus, in one example, John may work in a banking center in an identified location that sells a certain set of products that have associated risks. John has the ability to indicate that the process or procedure that he is to follow is not how it is being done (and should be changed). With the tools to immediately report that information, and receive credit or recognition, while systematically understanding the contacts that should be leveraged to implement the change, the entire process may become seamless. With the disclosed reward-based implementation, everyone in the organization may start to think about risk and how risk applies to their job. The information may be input into an interface that the person may be comfortable operating (e.g., a social media site).

At 1102, an event submission is received at substantially the same time as a potential risk event is identified by a user affected by the potential risk event. For example, as a person is performing various tasks, that person may encounter an issue (e.g., potential problem, risk, nonconformance, and so on). Thus, that person may interact with a social media platform in order to inform others of the situation and facilitate crowdsourcing to remediate the situation, as necessary.

At 1104, a risk rating associated with the event submission is determined. The risk rating may be determined based on a description of the event and certain elements of that description matching a trigger event. The risk rating may be utilized to restrict access to the event submission to a limited number of people.

The event submission is prioritized, at 1106. The event submission may be prioritized based on a parameter associated with the event submission. According to an example, the parameter may be a submitter's relationship to an issue identified in the event submission. In another example, the parameter may be a rating associated with a submitter of the event submission.

A response for the event submission is obtained, at 1108. The response may be received based, at least in part, on a priority of the event submission and the risk rating. The response is received from one or more persons that have knowledge about the event and/or may provide reasonable recommendations for remediating the issue identified by the event submission.

Real-time information related to a status of the event submission is output, at 1110. The status of the event submission may be output in comparison with other event submissions, or at substantially the same as statuses of the other event submissions are output. The real-time information may be output on respective devices of the submitter, the responders, and other affected persons.

Figure 12:
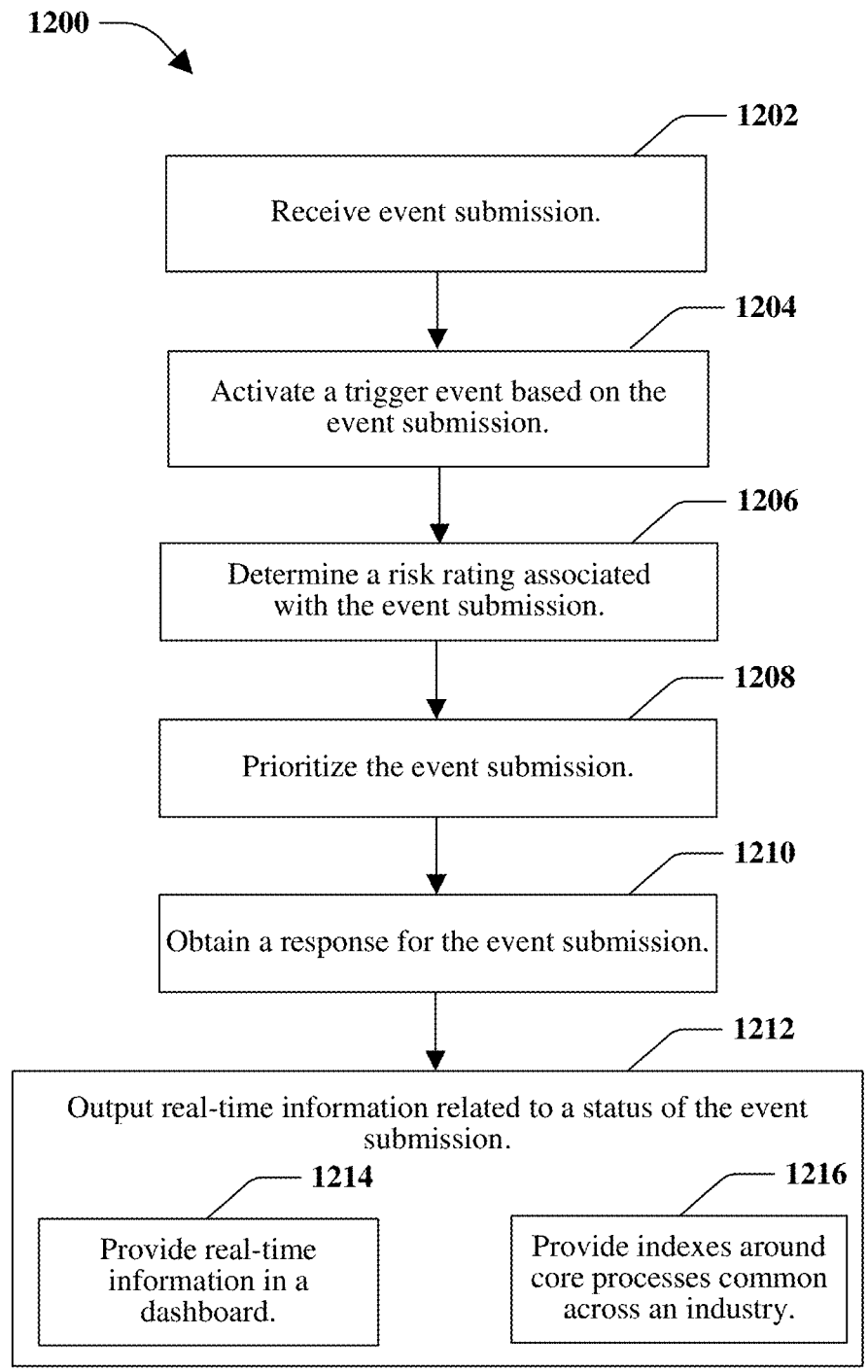
FIG. 12 illustrates an example, non-limiting method for quality improvement of an inventory of elements, according to an aspect.

FIG. 12 illustrates an example, non-limiting method 1200 for quality improvement of an inventory of elements, according to an aspect. The method 1200 in FIG. 12 may be implemented using, for example, any of the systems, such as the system 600 (of FIG. 6), described herein.

At 1202, an event submission is received. The event submission may relate to one or more elements of an inventory of elements. The event submission may be drafted and provided by a front-line worker at about the same time as the event occurs. According to some implementations, the event submission is input into a device owned, or controlled, by the user that is making the submission.

At 1204, a trigger event is activated. For example, information provided within the event submission is compared to a database or library of information that is of interest to the organization (or across organizations) that would escalate the event into a higher priority. The trigger event may be determined based on key words, phrases, or other items within a description of the event submission or other items associated with the event submission (e.g., category, type), referred to as a triggering item.

At 1206, a risk rating associated with the event submission is determined. The risk rating may be utilized to determine a set of persons to which an invitation to collaborate on resolving the event solution should be sent. If the risk rating is low (e.g., low risk), a broader audience of persons may be invited to participate. However, if the risk rating is high, it represents a higher risk, and the persons to which the invitation is sent should be limited. Further, event submissions with a high risk rating may be masked from viewing by others, as discussed herein.

At 1208, the event submission is prioritized. In the absence of a trigger event, the event submission is prioritized based on one or more parameters as discussed herein. However, if a trigger event has occurred, the prioritization may be increased (e.g., higher risk), decreased (e.g., lower risk), remain the same, or another action is performed (e.g., escalate the event without waiting for collaboration with others).

For example, an event submission description includes the terms "money transfer" and "multi-national." If the term "money transfer" was by itself, the priority may not be changed (e.g., no trigger event may occur). However, when that term is coupled with "multi-national," it may create the trigger (e.g., escalate the risk). Thus, when both terms are included together (e.g., in the same comments or description), the trigger may be to assign this event submission a highest priority.

A response to the event submission is obtained, at 1210. The response may be from one or more persons that were invited to collaborate on resolving the event submission. According to some implementations, the invitees may recommend other people that should be included to collaborate on the event.

At 1212, real-time information related to a status of the event submission is output in any perceivable format. The status may be comments made by the invitees (e.g., responders), for example. The status may also include other information, such as details about the persons invited to comment, details about the submitter, related event submissions, other event submissions that are currently pending, and so forth.

According to an implementation, outputting the real-time information may include providing the real-time information in a dashboard, at 1214. The dashboard is a visual representation of a status of one or more pending event submissions. The dashboard may allow a particular person to drill down into an identified event submission to obtain detailed information. The dashboard presented may be tailored to the user based on risk ratings associated with the event submission and the user.

Additionally or alternatively, outputting the real-time information may include providing indexes around core processes that are common across an industry, at 1216. The indexes may be provided based on a quantity of events that are related to a same or similar event (e.g., based on a defined category, a defined process, details provided in a comment or description field, and so on). The indexes may be provided in such a manner that identifying details related to the event submission are masked prior to the information being sent to a central repository that collects the data (e.g., a trusted third party), or after the information is received by the central repository, but prior to being distributed to the industry participants. Through utilization of the indexes (e.g., trends in the industry, statistics related to events, geographic data, and so on), the industry participants may determine how their particular organization is performing as compared to the industry as a whole. This may aid in quality assurance and improvement efforts.

Figure 13:
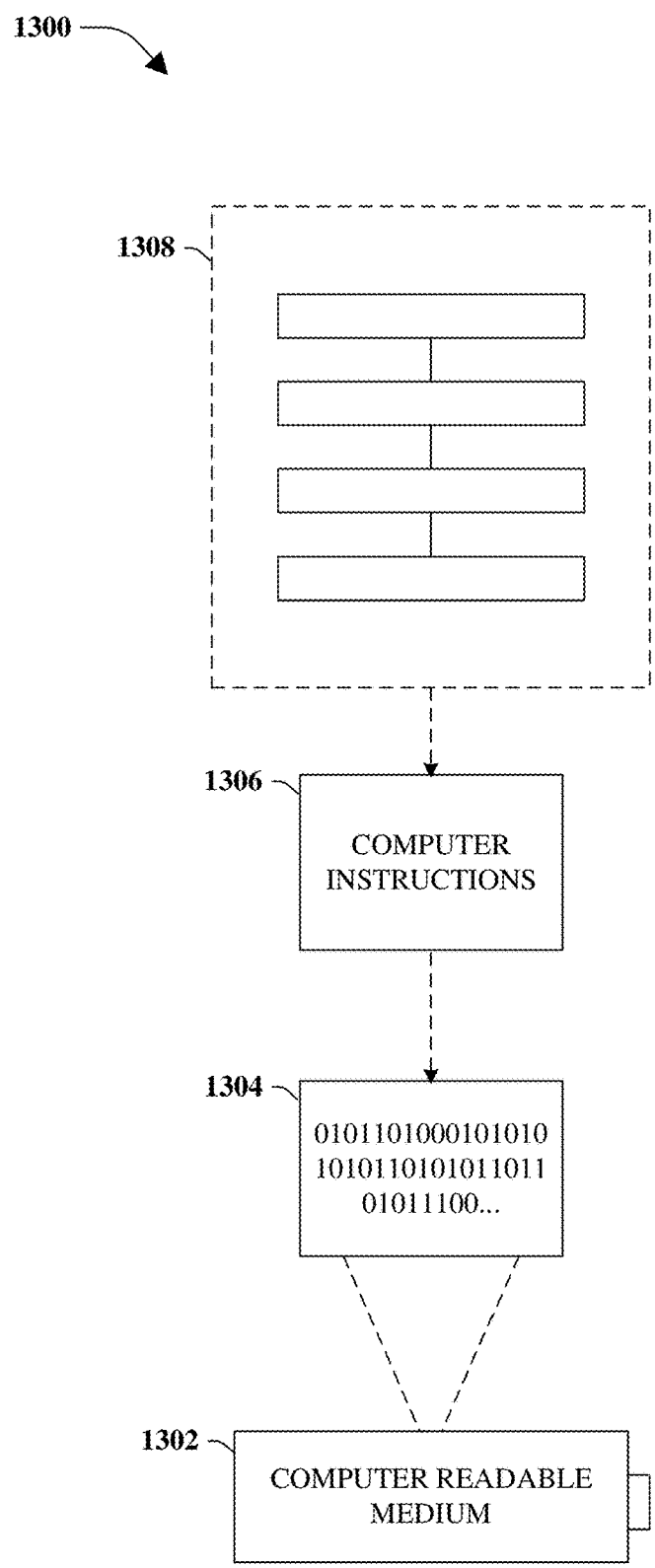
FIG. 13 illustrates an example, non-limiting computer-readable medium or computer-readable device including processor-executable instructions configured to embody one or more of the aspects set forth herein.

One or more implementations include a computer-readable medium including microprocessor or processor-executable instructions configured to implement one or more embodiments presented herein. As discussed herein the various aspects enable identification of anomalous transaction attributes in real-time with adaptive threshold tuning. An embodiment of a computer-readable medium or a computer-readable device devised in these ways is illustrated in FIG. 13, wherein an implementation 1300 includes a computer-readable medium 1302, such as a CD-R, DVD-R, flash drive, a platter of a hard disk drive, and so forth, on which is encoded computer-readable data 1304. The computer-readable data 1304, such as binary data including a plurality of zero's and one's as illustrated, in turn includes a set of computer instructions 1306 configured to operate according to one or more of the principles set forth herein.

In the illustrated embodiment 1300, the set of computer instructions 1306 (e.g., processor-executable computer instructions) may be configured to perform a method 1308, such as the method 1100 of FIG. 11 and/or the method 1200 of FIG. 12, for example. In another embodiment, the set of computer instructions 1306 may be configured to implement a system, such as the system 300 of FIG. 3 and/or the system 600 of FIG. 6, for example. Many such computer-readable media may be devised by those of ordinary skill in the art that are configured to operate in accordance with the techniques presented herein.

As used in this application, the terms "component", "module," "system", "interface," "manager," and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter may be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 13 and the following discussion provide a description of a suitable computing environment to implement embodiments of one or more of the aspects set forth herein. The operating environment of FIG. 13 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

Figure 14:
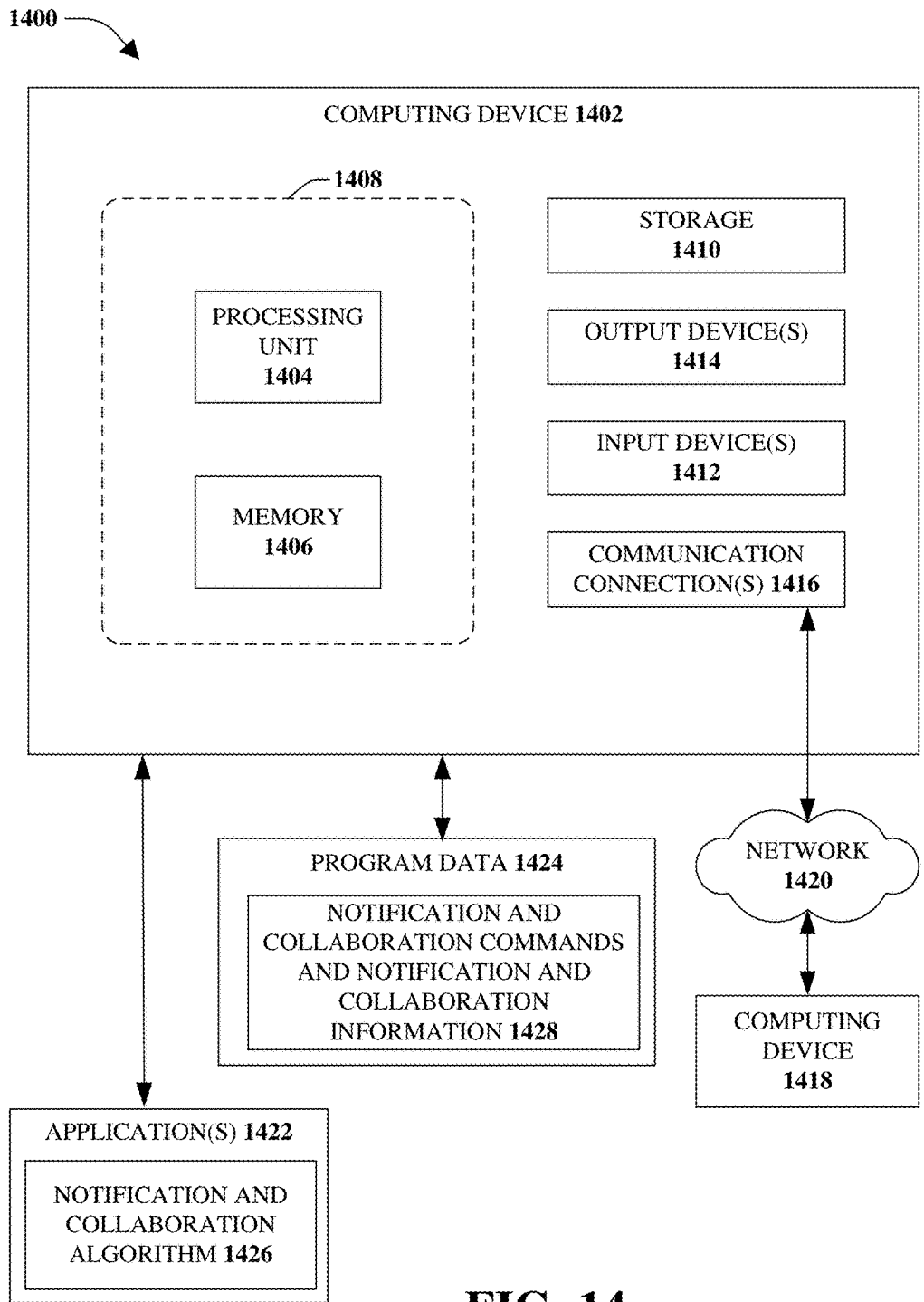
FIG. 14 illustrates an example, non-limiting computing environment where one or more of the aspects set forth herein are implemented, according to one or more aspects.

FIG. 14 illustrates a system 1400 that may include a computing device 1402 configured to implement one or more embodiments provided herein. In one configuration, the computing device 1402 may include at least one processing unit 1404 and at least one memory 1406. Depending on the exact configuration and type of computing device, the at least one memory 1406 may be volatile, such as RAM, non-volatile, such as ROM, flash memory, etc., or a combination thereof. This configuration is illustrated in FIG. 14 by dashed line 1408.

In other embodiments, the computing device 1402 may include additional features or functionality. For example, the computing device 1402 may include additional storage such as removable storage or non-removable storage, including, but not limited to, magnetic storage, optical storage, etc. Such additional storage is illustrated in FIG. 14 by storage 1410. In one or more embodiments, computer readable instructions to implement one or more embodiments provided herein are in the storage 1410. The storage 1410 may store other computer readable instructions to implement an operating system, an application program, etc. Computer readable instructions may be loaded in the at least one memory 1406 for execution by the at least one processing unit 1404, for example.

Computing devices may include a variety of media, which may include computer-readable storage media or communications media, which two terms are used herein differently from one another as indicated below.

Computer-readable storage media may be any available storage media, which may be accessed by the computer and includes both volatile and nonvolatile media, removable and non-removable media. By way of example, and not limitation, computer-readable storage media may be implemented in connection with any method or technology for storage of information such as computer-readable instructions, program modules, structured data, or unstructured data. Computer-readable storage media may include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which may be used to store desired information. Computer-readable storage media may be accessed by one or more local or remote computing devices (e.g., via access requests, queries or other data retrieval protocols) for a variety of operations with respect to the information stored by the medium.

Communications media typically embody computer-readable instructions, data structures, program modules, or other structured or unstructured data in a data signal such as a modulated data signal (e.g., a carrier wave or other transport mechanism) and includes any information delivery or transport media. The term "modulated data signal" (or signals) refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The computing device 1402 may include input device(s) 1412 such as keyboard, mouse, pen, voice input device, touch input device, infrared cameras, video input devices, or any other input device. Output device(s) 1414 such as one or more displays, speakers, printers, or any other output device may be included with the computing device 1402. The input device(s) 1412 and the output device(s) 1414 may be connected to the computing device 1402 via a wired connection, wireless connection, or any combination thereof. In one or more embodiments, an input device or an output device from another computing device may be used as the input device(s) 1412 and/or the output device(s) 1414 for the computing device 1402. Further, the computing device 1402 may include communication connection(s) 1416 to facilitate communications with one or more other devices, illustrated as a computing device 1418 coupled over a network 1420.

One or more applications 1422 and/or program data 1424 may be accessible by the computing device 1402. According to some implementations, the application(s) 1422 and/or program data 1424 are included, at least in part, in the computing device 1402. The application(s) 1422 may include a notification and collaboration algorithm 1426 that is arranged to perform the functions as described herein including those described with respect to the system 300 of FIG. 3. The program data 1424 may include notification and collaboration commands and notification and collaboration information 1428 that may be useful for operation with the various aspects as described herein.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or." Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising," "comprises," "including," "includes," or the like generally means comprising or including.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A system, comprising:
    a processor that executes the following computer executable components stored in a memory:
        an input manager that receives a risk event submission at substantially the same time as a risk event is encountered;
        a risk manager that determines a risk rating associated with the risk event submission;
        a categorization manager that prioritizes the risk event submission based on at least one parameter of the risk event submission, wherein a priority of the risk event submission is relative to other risk events submissions;
        a collaboration manager that obtains input for the risk event submission based, at least in part, on the priority of the risk event submission and the risk rating;
        a status manager that provides real-time information related to a status of the risk event submission, wherein the status manager obtains at least information related to risk event submissions across an industry; and
        an incentive component that provides motivation for entry of the risk event submission,
        wherein the incentive component assigns a credibility index to a submitter and the categorization manager uses the credibility index for prioritization of the risk event submission.

2. The system of claim 1, wherein the risk event submission is related to an inventory of elements associated with an organization.

3. The system of claim 1, wherein the at least one parameter comprises a relationship between a submitter and a risk issue identified in the risk event submission.

4. The system of claim 1, wherein the input for the risk event submission comprises a resolution to the risk event or an escalation of the risk event to a higher priority.

5. The system of claim 1, wherein the status manager provides the real-time information in a dashboard that tracks progress of the risk event submission.

6. The system of claim 1, wherein the status manager provides indexes around core processes that are common across an industry.

7. The system of claim 1, wherein the computer executable components further comprise an incentive component that provides motivation for entry of the risk event submission.

8. The system of claim 7, wherein the incentive component assigns a credibility index to a submitter, the categorization manager uses the credibility index for prioritization of the risk event submission.

9. The system of claim 1, wherein the computer executable components further comprise a parse component that analyzes information associated with the risk event submission and determines activation of a trigger event.

10. The system of claim 9, wherein the parse component cross-references information associated with the risk event submission to a library that comprises items of interest to determine the trigger event.

11. The system of claim 1, wherein the computer executable components further comprise a routing component that determines invitees to respond to the risk event submission, wherein the invitees provide the input for the risk event submission.

12. A method, comprising:
receiving, by a system comprising a processor, an event submission at substantially the same time as a potential risk event is identified by a user affected by the potential risk event;
interacting with a social media platform in order to inform others of the risk and facilitate crowdsourcing to aid in remediation;
determining, by the system, a risk rating associated with the event submission;
prioritizing, by the system, the event submission based on a parameter associated with the event submission, wherein the prioritizing the event submission comprises prioritizing based on a rating associated with a submitter of the event submission;
obtaining, by the system, a response for the event submission based, at least in part, on a priority of the event submission and the risk rating; and
outputting, by the system, real-time information related to a status of the event submission in comparison with other event submissions.

13. The method of claim 12, wherein the prioritizing the event submission comprises prioritizing based on a relationship of a submitter to an issue identified in the event submission.

14. The method of claim 12, wherein the outputting real-time information comprises providing real-time information in a dashboard that tracks progress of the event submission and other progresses of other risk event submissions.

15. The method of claim 12, wherein the outputting real-time information comprises providing indexes around core processes that are common across an industry.

16. The method of claim 12, further comprising activating, by the system, a trigger event based on a determination that information associated with the event submission matches the trigger event.

17. A non-transitory computer-readable storage device that stores executable instructions that, in response to execution, cause a system comprising a processor to perform operations, comprising:
receiving an event submission at substantially the same time as a potential risk event is encountered by a user, wherein the user is associated with a credibility index;
assigning a risk level to the event submission based on details identified in the event submission, wherein the risk level is utilized to determine a set of persons to which an invitation to collaborate on resolving the event solution should be sent;
determining a priority of the event submission based on a parameter associated with the event submission and the credibility index, wherein the parameter relates to at least one of a submitter, an event, an identified risk, or combinations thereof, wherein the at least one parameter comprises a rating associated with a submitter of the risk event submission;
obtaining a response for the event submission based on the priority and a determined risk rating; and
outputting real-time information related to a status of the event submission until the event submission is closed.

18. The non-transitory computer-readable storage device of claim 17, wherein the operations further comprise providing motivation to the user for entry of the event submission.

* * * * *